July 21, 1970  E. J. HUNKELER ET AL  3,521,524
CONTROL APPARATUS FOR CHECKING AND CONTROLLING
SEQUENTIAL MACHINE OPERATIONS
Filed Oct. 1, 1968  14 Sheets-Sheet 1

INVENTORS
ERNST J. HUNKELER
& ROBERT A. WAASDORP
BY
Cushman, Darby & Cushman
ATTORNEYS

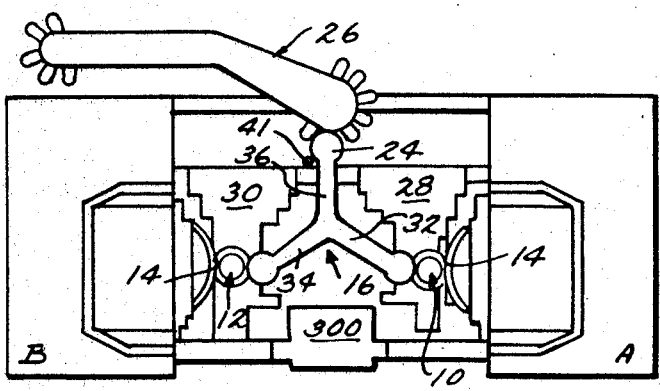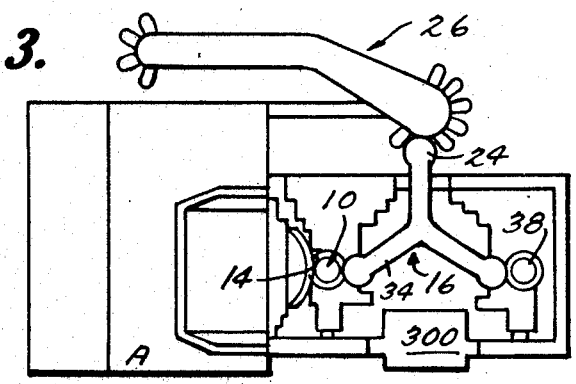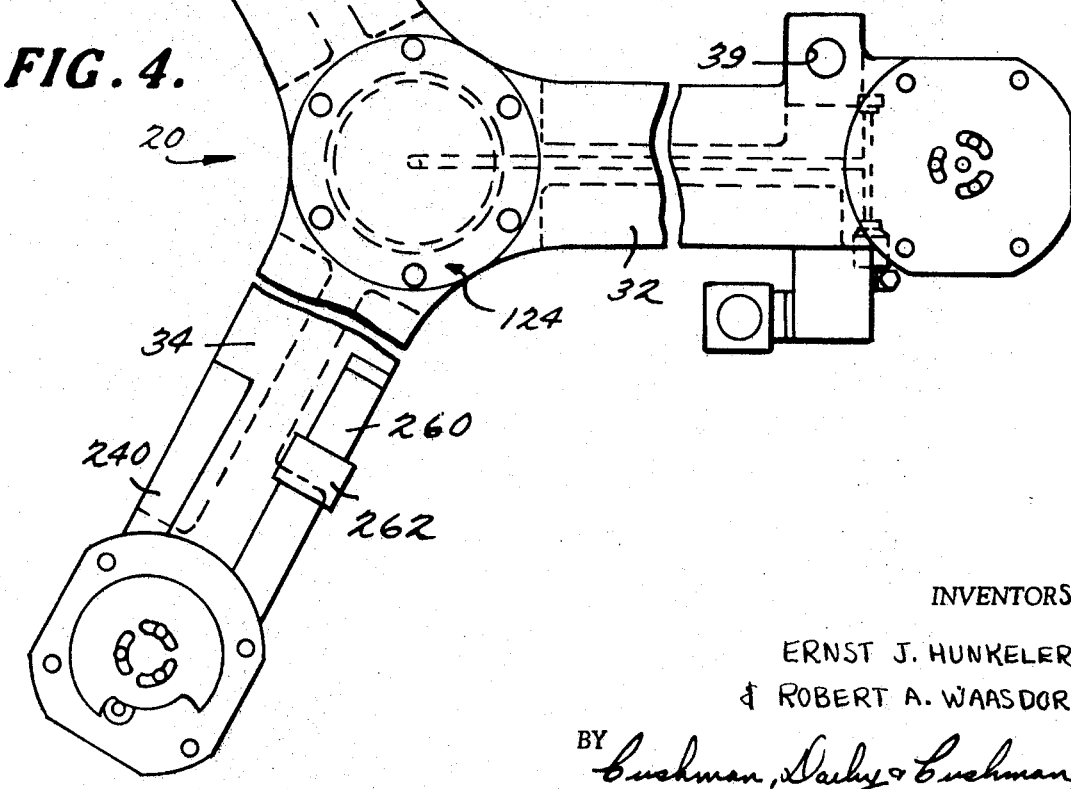

July 21, 1970    E. J. HUNKELER ET AL    3,521,524
CONTROL APPARATUS FOR CHECKING AND CONTROLLING
SEQUENTIAL MACHINE OPERATIONS
Filed Oct. 1, 1968    14 Sheets-Sheet 3

INVENTORS
ERNST J. HUNKELER
& ROBERT A. WAASDORP

BY Cushman, Darby & Cushman
ATTORNEYS

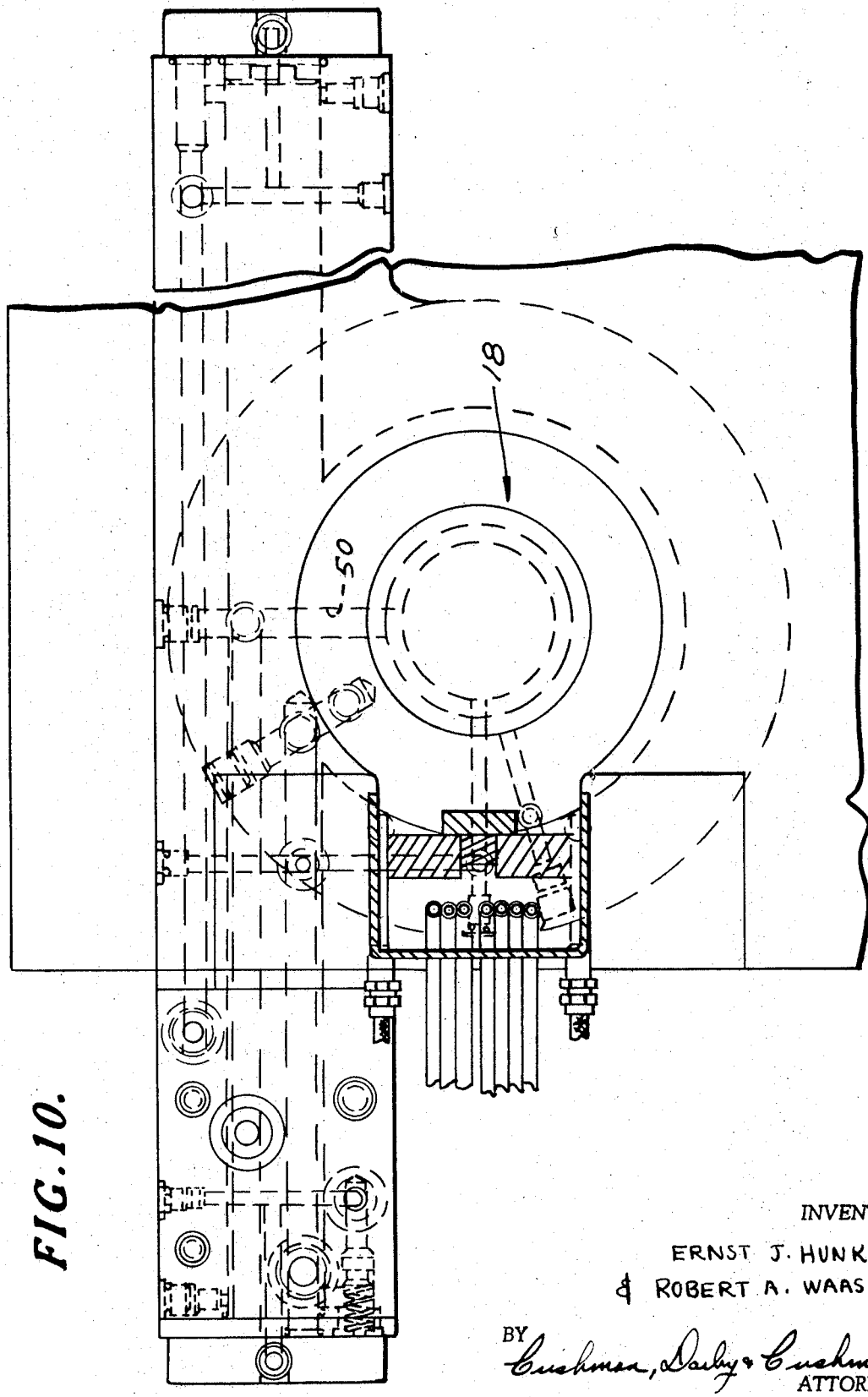

INVENTORS
ERNST J. HUNKELER
& ROBERT A. WAASDORP

BY *Cushman, Darby & Cushman*
ATTORNEYS

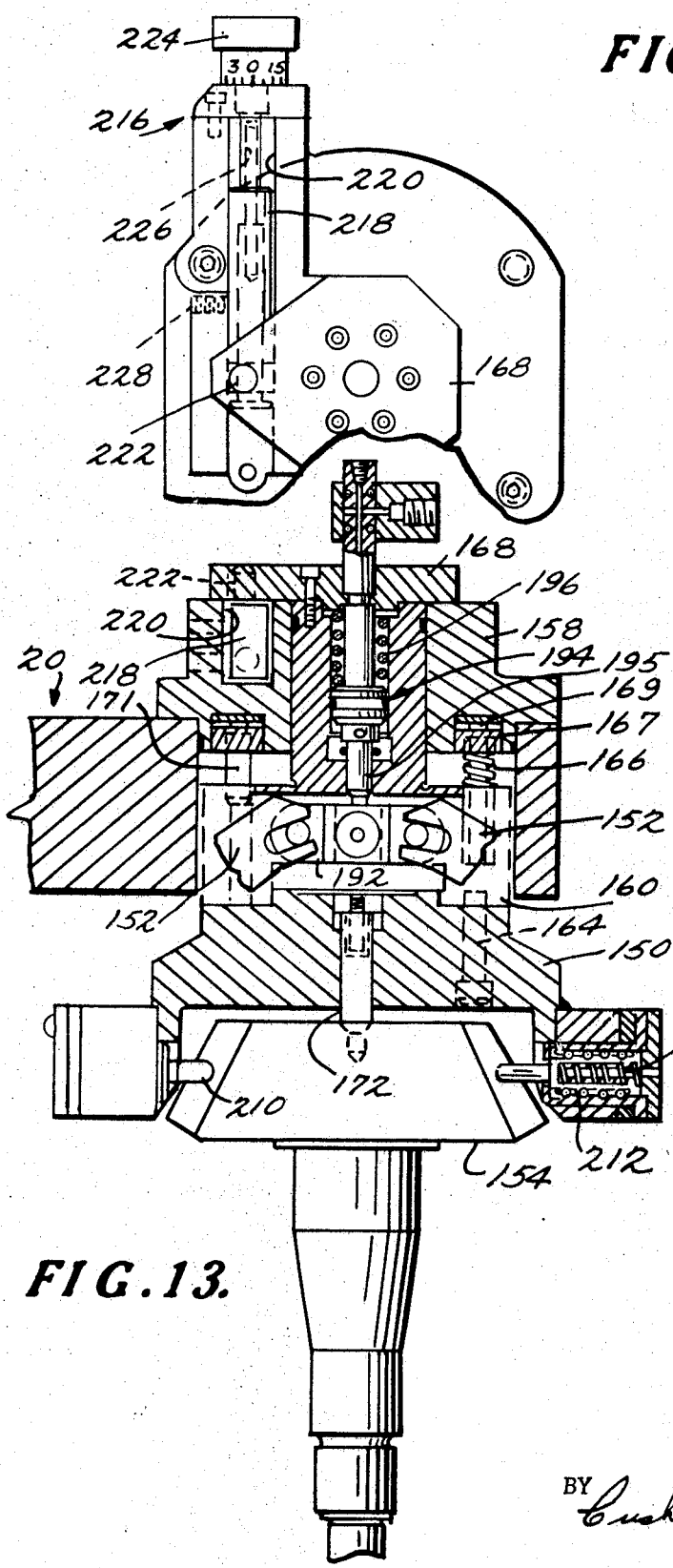
FIG.14.
FIG.13.
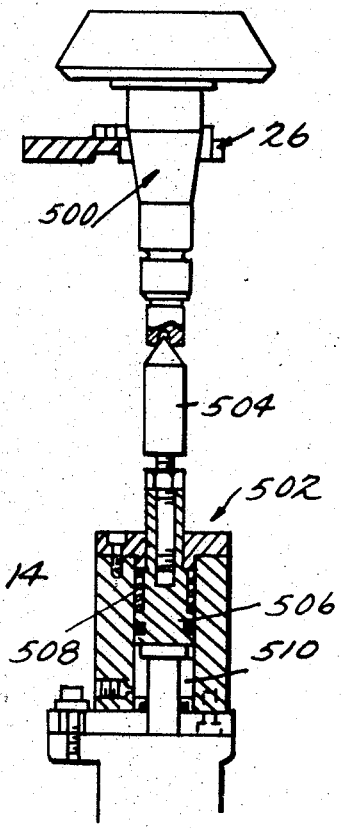
FIG.27.
INVENTORS
ERNST J. HUNKELER
& ROBERT A. WAASDORP
BY *Cushman, Darby & Cushman*
ATTORNEYS

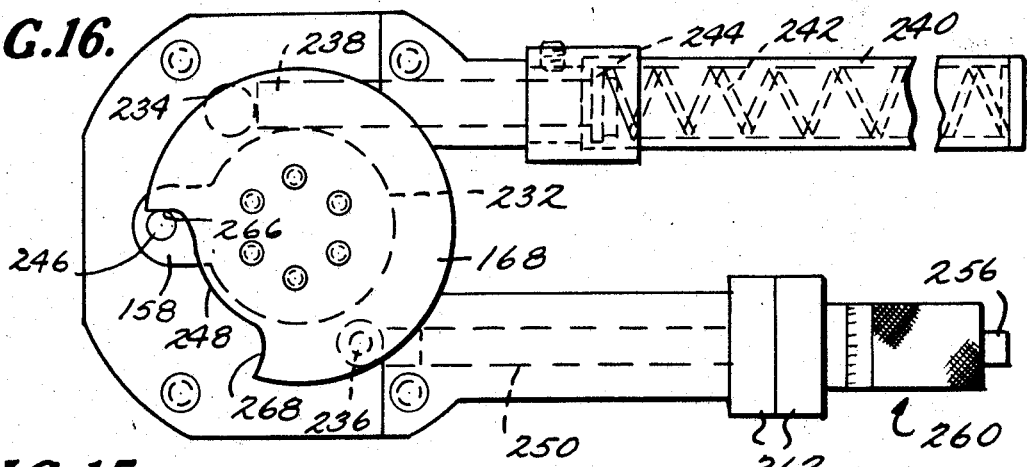
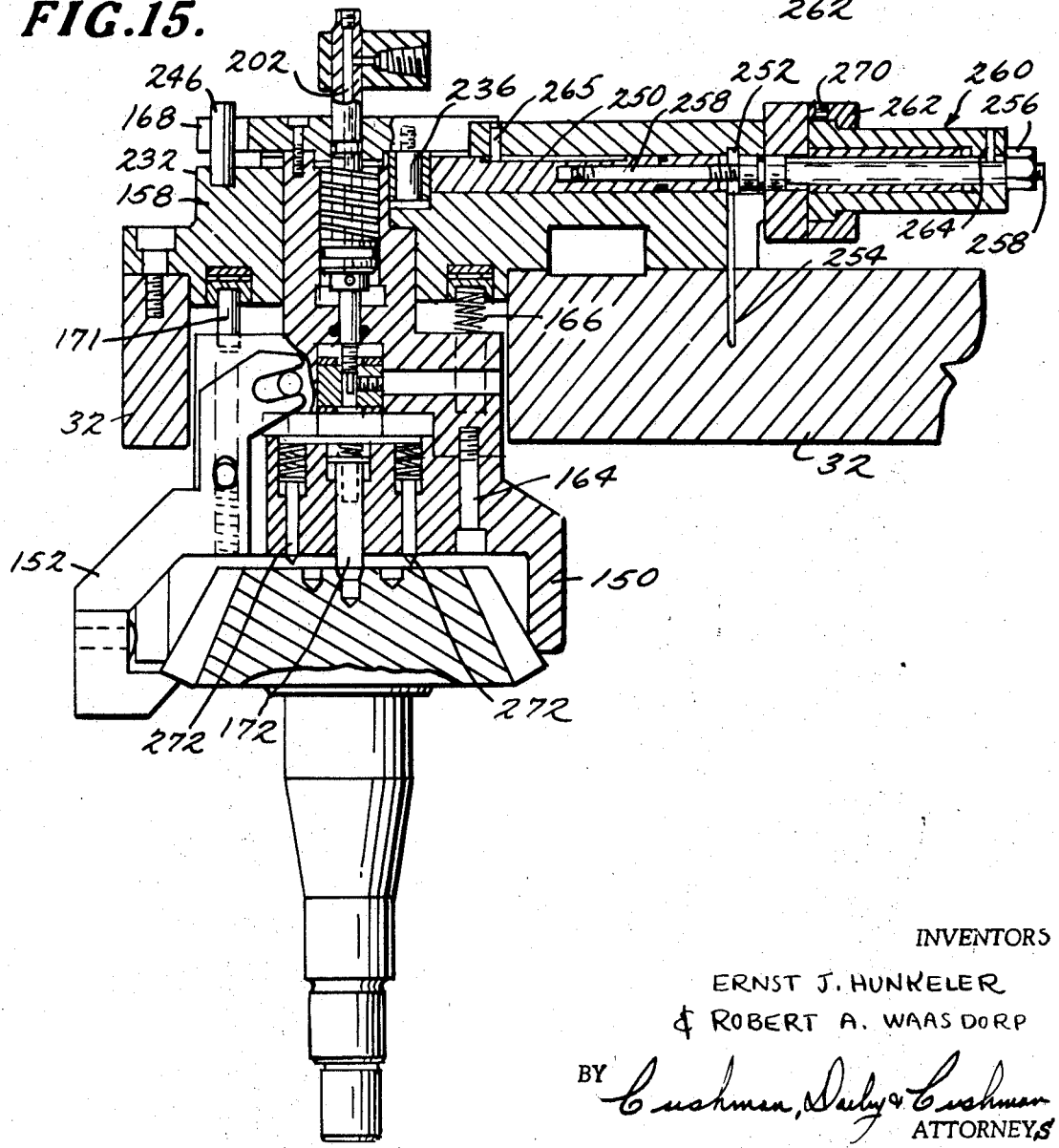

July 21, 1970   E. J. HUNKELER ET AL   3,521,524
CONTROL APPARATUS FOR CHECKING AND CONTROLLING
SEQUENTIAL MACHINE OPERATIONS
Filed Oct. 1, 1968                                14 Sheets-Sheet 9

INVENTORS
ERNST J. HUNKELER
& ROBERT A. WAASDORP

BY Cushman, Darby & Cushman
ATTORNEY

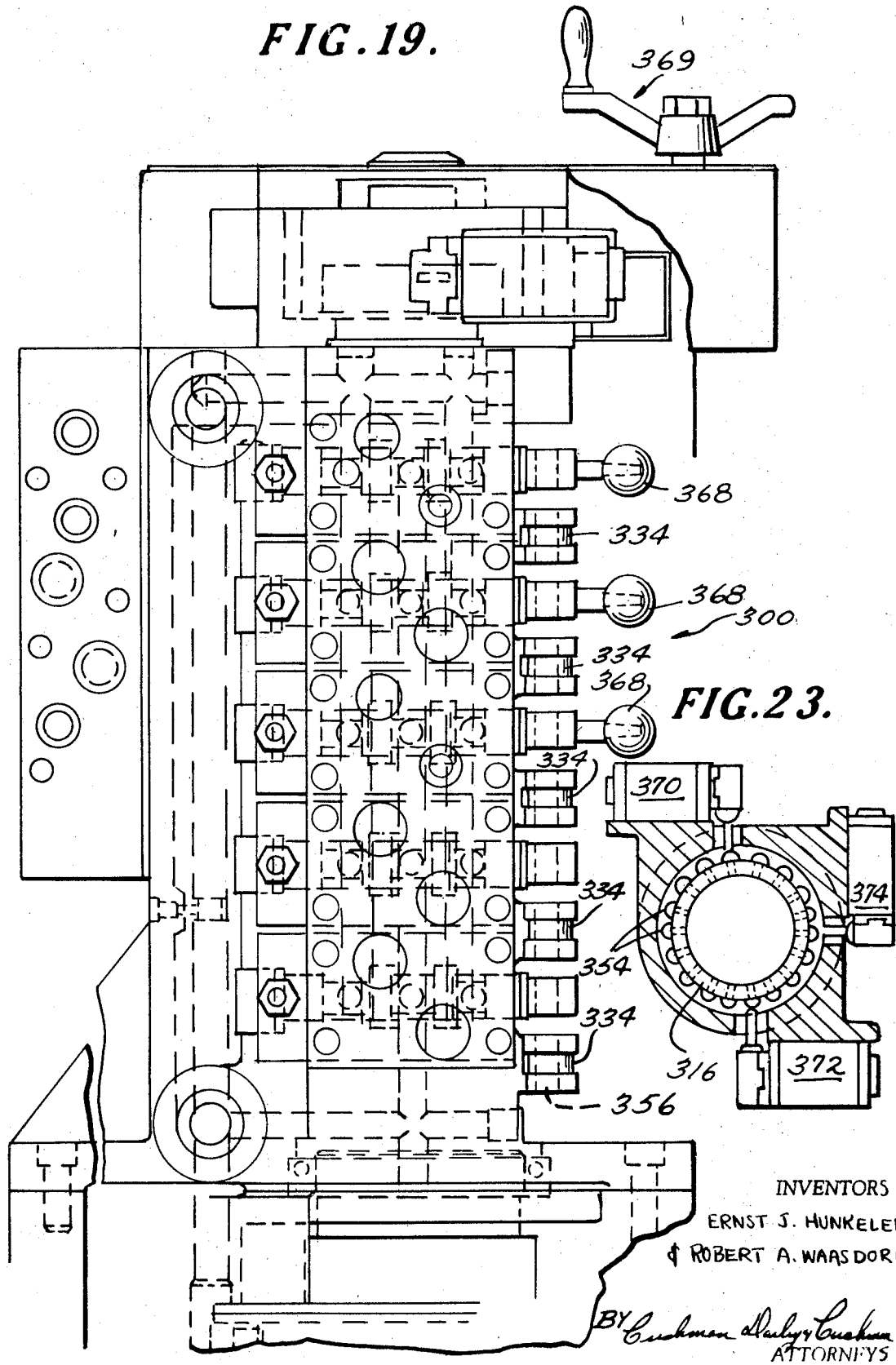

INVENTORS
ERNST J. HUNKELER
& ROBERT A. WAASDORP

INVENTORS
ERNST J. HUNKELER
& ROBERT A. WAASDORP

BY Cushman, Darby & Cushman
ATTORNEYS 3,521,524
CONTROL APPARATUS FOR CHECKING AND CONTROLLING SEQUENTIAL MACHINE OPERATIONS
Ernst J. Hunkeler and Robert A. Waasdorp, Fairport, N.Y., assignors to The Gleason Works, Rochester, N.Y., a corporation of New York
Filed Oct. 1, 1968, Ser. No. 764,220
Int. Cl. B23f 1/00; G05b 19/06
U.S. Cl. 90—1
20 Claims

ABSTRACT OF THE DISCLOSURE

A work loader and transfer device for handling and moving gear blanks and gear pieces from one station to another in a gear cutting apparatus is disclosed. The work loader and transfer device is constructed to operate between at least two cutting or working positions of a machine and includes means for being lifted and lowered as well as rotated back and forth about a vertical axis of rotation. Work holding devices are positioned on the ends of arms associated with the work loader and transfer device, and more than one type of work holding device may be associated with a single work loader and transfer means. Each work holding device includes a centering cup means for contacting a gear piece and for centering the same relative to the work loader and transfer device, and jaw members are provided for affecting a tight grip of the workpiece. Means may be provided for rotating or indexing the workpiece relative to the loader and transfer device so that the workpiece is properly oriented for a cutting operation. A control system is provided for checking and controlling a sequence of operations of a machine, and the control system may be combined with the work loader and transfer device to effect its sequential operations. The control system includes means for taking air read-outs of various functions of a machine to detect a failure of any given function in a sequence, and the control system includes means for shutting down automatic operation of a machine if such a failure occurs. In addition, a checking device is provided on a bevel gear cutting machine to determine proper stock division and seating of a workpiece after it has been transferred to a work station. The checking device may be included in the control system so that improper positioning of a workpiece will result in a shutdown of handling operations for a gear cutting machine. Also, a method for handling work blanks and workpieces between two or more stations of gear cutting apparatus is described.

BACKGROUND AND BRIEF DESCRIPTION OF INVENTION

This invention relates to improvements in apparatus and systems for loading, handling, and transferring workpieces from one station to another relative to machines which can perform a series of sequential operations on the workpieces. In particular, one part of the invention is concerned with a work loader and transfer arrangement for bevel gear cutting machines of the type where two or more work stations are provided for roughing or finishing work blanks and workpieces. The work loader arrangement includes a device which can load workpieces into and out of work stations of a gear cutting machine, and the device includes means for transferring the same workpieces from one station to the next in machines which involve more than one cutting operation. The work loading and transferring arrangement of this invention provides for a novel method of processing workpieces from a source and through a series of cutting operations.

Another part of the invention involves a novel control system for checking the completion of each operation involved in a sequence of operations of a machine. The control system has special utility for work loader and transfer devices of the type which will be described for bevel gear cutting machines, but the control system is also useful for any other machine which must perform a series of operations in a sequence which requires that each operation be fully completed before a subsequent operation of the series can be started. The invention also provides for a proper orientation of workpieces relative to a work station of a machine, and a checking device is provided for determining whether proper orientation has taken place. The checking device may be included in the control system so that a detection of improper orientation of the workpiece will stop subsequent operations of the machine before any damage can result.

Generally, it is known in this art to provide for some means of transferring gear blanks and gear pieces from one station to another in gear cutting apparatus. Typical prior art arrangements for handling work in such machines is disclosed in Pats. 2,773,426; 2,782,689; 3,169,446; 3,229,585; and 3,354,782. However, for one reason or another, such work handling systems have not become accepted in the industry of spiral bevel and hypoid pinions to any great extent, and the present invention is concerned with solving problems involved in handling workpieces of a shape and size typically encountered in bevel gear cutting operations. Because of the irregular shape of a bevel gear blank and because of a need for very precise placement of such a blank relative to a gear cutting machine, it has been difficult to provide an arrangement which will automatically load and unload such pieces into and out of a gear cutting machine. The problems of handling and placement are compounded even more where more than one gear cutting machine is involved, and the present invention directs itself to improvements which permit a reliable and precise handling of such workpieces in high speed gear cutting machines which may include more than one cutting station. The types of machines contemplated by the present invention are being prepared for marketing by Gleason Works under a general development of new machines, and these particular machines are concerned with automatically cutting hypoid pinions, at high speeds and with great precision, for use in automotive drive trains. A number of separate patent applications are being filed contemporaneously with this application to cover various features of machines included in this overall development on the part of Gleason Works, and reference is made to the separate patent applications for descriptions of other improvements associated with such machines.

In addition to improving the handling and transferring of workpieces in gear cutting machines, the present invention provides a novel control system which is useful for checking and controlling a sequence of operations for any machine in which a step of operation must be fully completed before a subsequent step can be started. The control system represents an improvement over prior arrangements which require a great number of electrical switching devices and sensors for checking and controlling a complex sequence of movements inasmuch as it requires only a single fluid pressure switch to sense the completion of each step of a machine operation. This arrangement substantially improves the reliability of a control system by eliminating the problems of switch failure and maintenance associated with devices which involve a great number of switching and detecting mechanisms. Basically, the control system of this invention provides a series of passageways leading to various elements involved in the operation of a machine, and the passageways are situated so that completion of a given operation functions to block an outlet of a given passageway. A single conduit communicating with a source of air under pressure can be placed into communication with selected passageways in sequence by a distributor system provided in the control system, and a pressure sensitive switch in the supply conduit detects the presence or absence of air pressure in the conduit. Detection of a certain level of air pressure maintains continued operation of a control drum associated with dictating the operations of the machine, but a failure to reach a certain level of pressure results in a shutdown of automatic operations until any error in machine operation can be completed or corrected. The control drum associated with the control system may comprise a plurality of cams stacked on a common axis of rotation so as to individually dictate control movements to various operations of a machine in accordance with rotation of the drum in which the cams are carried. The air read-out system can be operatively associated with means for rotating the cam drum so that a failure of any single operation of the machine can be detected to stop further rotation of the drum as well as further machine operations which would normally be dictated thereby.

The combination of a work loader and transferring device with the novel control system of this invention provides for a completely automatic method of transferring workpieces from station-to-station in gear cutting machinery involving more than one work station. The work loader and transferring device can be completely controlled and checked in its operation by the control system of this invention so that the proper placement and orientation of each workpiece is detected in each transfer operation. It is very important not only that gear blanks and gear pieces be properly placed in work spindles where they can be cut, but also that they be oriented very precisely so that a single tooth profile can be cut more than once and at more than one work station. For example, after a blank has been rough cut, it is necessary to provide additional cutting operations which finish the profile of the roughed teeth and grooves on the gear blank. Finish cutting may be accomplished by two machines in accordance with the present invention by cutting one side of each tooth groove at one work station, and then, cutting an opposite side of each tooth groove at a second work station. Such cutting operations can be carried out at high speeds with dual machines of the type contemplated by this invention, but it can be seen that it is necessary to provide a very precise placement and orientation of each workpiece between each cutting station when finish cutting is to be accomplished in the manner just described. Thus, it is also important to detect proper orientation, and to stop further operations if necessary, as provided by the work handling and control system arrangements of this invention.

In addition to the work handling and control system arrangements just described, the invention also provides for a checking device which can determine whether proper orientation of a workpiece has actually taken place between work stations, and this device is positioned near a work spindle so as to check the positioning of a workpiece as it is being received into the work spindle for a cutting operation. The checking device includes a projecting element for detecting stock division of the workpiece, and a separate means is provided for taking an air read-out of the seating of the workpiece in the work spindle. Although prior arrangements have been provided for manually, or otherwise, determining stock division of a workpiece (see for example the mechanical arrangement shown in Pat. 2,782,689), the checking device of the present invention provides improvements which permit the checking functions to be included in an air read-out control system of the type included in this invention.

These and other features of the invention will be discussed in greater detail below, and in that discussion reference will be made to the accompanying drawings which are briefly described below.

BRIEF DESCRIPTION OF DRAWINGS

FIG. 2 is a top plan schematic view of a bevel gear cutting arrangement involving a transfer of work between three separate stations which include two gear cutting stations and one station supplied by a conveyor;

FIG. 3 is a view similar to FIG. 2 showing a work loader arrangement which operates between three stations which include only a single gear cutting station;

FIG. 4 is a top plan view of radially disposed arm structures associated with the loader and transfer means of this invention;

FIG. 10 is a top plan view of the base of the loader and transfer device showing air and hydraulic connection associated with the operation of the turret and loader apparatus;

FIG. 13 is a detailed elevational view similar to FIG. 11 but showing a second type of holding means which may be used with the loader and transfer means of this invention;

FIG. 14 is a top plan view of a portion of the holding means of FIG. 13, illustrating a manually operated adjustment mechanism associated therewith;

FIG. 15 is a vertical elevational view in partial cross section, similar to FIGS. 11 and 13, showing a third type of holding means which may be used with this invention;

FIG. 16 is a top plan view of a portion of the holding means of FIG. 15, showing an indexing system which provides for automatic stock division when a workpiece is transferred from one station to another;

FIG. 19 is an elevational side view of the control system of this invention;

FIG. 23 is a third cross sectional view of a portion of the control system taken on line 23—23 of FIG. 20;

FIG. 27 is an elevational view in partial cross section of a mechanism associated with a conveyor for handling workpieces.

DETAILED DESCRIPTION OF INVENTION

Figure 1:
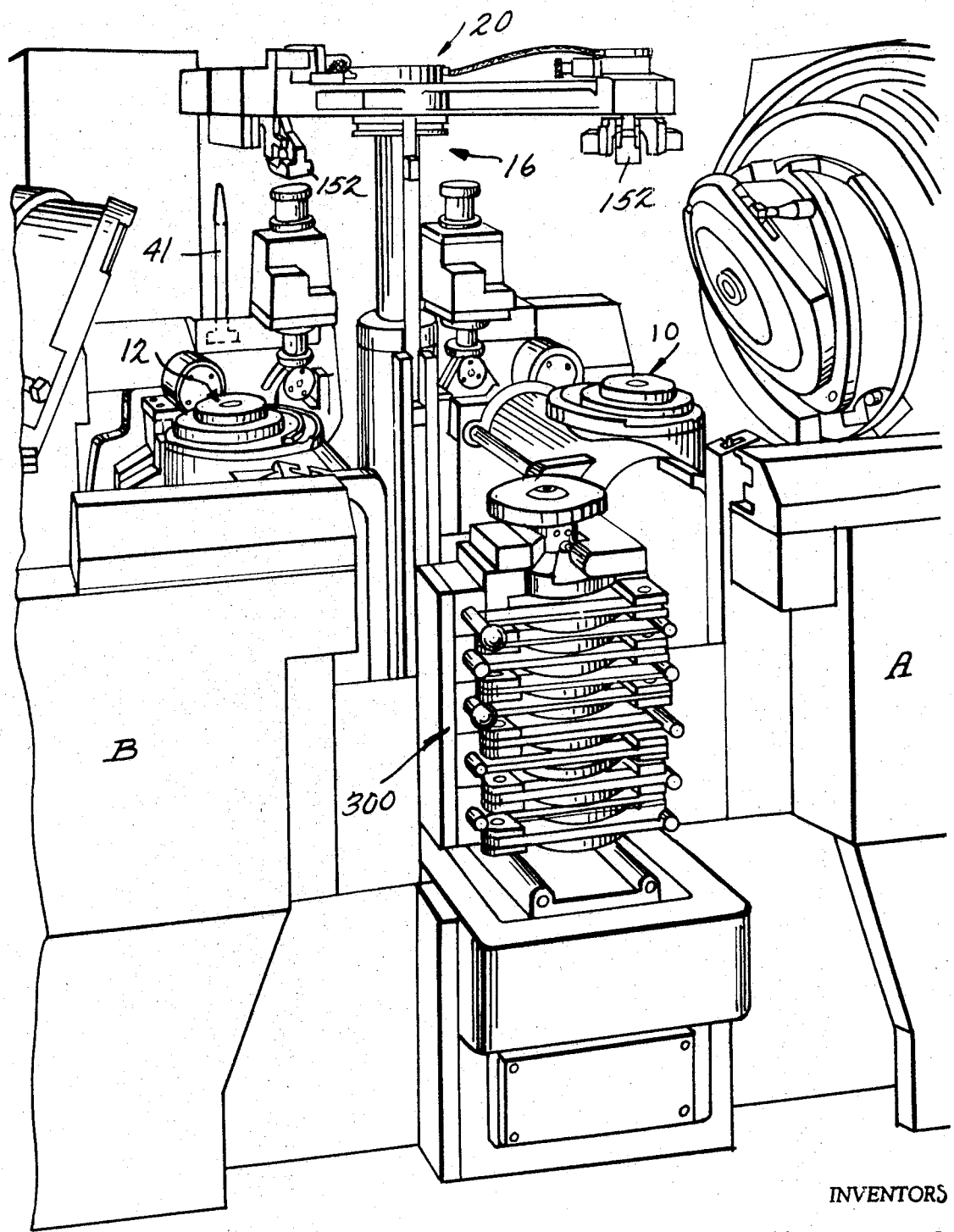
FIG. 1 is a perspective view of a duel bevel gear cutting machine having two cutting stations between which gear blanks can be moved for separate cutting operations, and this figure illustrates a work loader and transfer means, together with a control system for such means, in a machine of this type.

Apparatus and method for loading and unloading workpieces into a bevel gear cutting machine and for transferring workpieces between stations As discussed above, one part of the present invention provides for a novel work loader and transfer means which can be used with bevel gear cutting machines. The novel work loader and transfer means may be positioned between two or more work stations associated with a gear cutting machine. For example, it has now become feasible to provide dual cutting machines having two work stations which can carry out cutting operations simultaneously on two separate workpieces. The loader and transfer means of this invention can be positioned between the two work stations so as to move a work blank into and out of cutting positions in a method which greatly increases the speed of cutting. In a typical installation, the loader and transfer means may include three arm members radially disposed outwardly from a central vertical turret, and the arm members each carry work holders near their terminal ends so that individual workpieces can be gripped by the work holders and transferred to different work stations. When dual cutting machines are used in combination with the loader and transfer means, it is preferred that a third station be provided as a point (a) from which workpieces can be received from a supply and (b) to which workpieces can be returned after they have undergone two cutting operations at the two separate stations of the machines. Typically, a work blank will be lifted from the source station, which may be included as a part of a conveyor means, and then, the workpiece will be transferred to a first cutting station of one of the gear cutting machines. Simultaneously, a previously cut workpiece is lifted and transferred from the first work station to a second station associated with a second gear cutting machine, and also at the same time, a third workpiece is returned to the source station from the second cutting machine. Thus, there is a simultaneous gripping, lifting, transferring of three separate workpieces to three different stations, and then, all three workpieces are released for whatever operation is to be performed at their respective stations. After each cutting cycle, the work loader and transfer means is oscillated back to a starting position so that it can once again pick up three workpieces and perform the same transfer operation. The conveyor means may include driving means for moving the workpieces toward and away from a pickup and receiving point, and the driving means is controlled to provide a step-wise movement so that the conveyor is stopped when pieces are being picked up from or deposited on the conveyor. In order to handle work blanks and workpieces with great precision, as is required in finish cutting hypoid pinion gears for example, it is necessary to provide work holder means which function not only to grip a workpiece carefully but also to properly orient a workpiece relative to the cutter of any machine that it will be moved to. It has been found that three different types of holding means are required in certain loading and transfer operations for hypoid pinion gear manufacture, and there will be a detailed discussion of each of the three different types in a later part of this specification.

Referring to FIG. 1, a dual gear cutting machine is shown in perspective view in a typical manufacturing set-up for producing hypoid pinion gears. The dual machine includes a first work station 10 and a second work station 12 at which pinion gear pieces can be received in work spindles associated with the work stations. The means for holding workpieces in place at the stations may include well known mechanisms for chucking and dechucking a workpiece as well as means for moving the entire work spindle assembly into a proper position for engagement of cutters 14 with each of the workpieces. Between the two work stations is positioned a work loader and transfer means 16 which functions to automatically load workpieces into and out of each of the work stations 10 and 12 and to transfer workpieces between those stations as well as between the dual gear cutting machine and a conveyor or other source of supply. The loader and transfer means 16 includes a turret assembly 18 which can be lifted and lowered to raise and drop workpieces at the separate stations in accordance with a precise sequence of operations. In addition, the turret assembly 18 can be rotated about its own vertical axis so as to move arm members, generally indicated at 20, back and forth between the work stations. FIG. 1 also illustrates a control system 300 which is a separate part of this invention and which may be utilized in any machine requiring a careful control and sequencing of a series of operations.

FIGS. 2 and 3 illustrate typical layouts for utilizing the loader and transfer means of the present invention between two or more stations. In the FIG. 2 arrangement, two machines A and B are related to one another, as in FIG. 1, to form a dual cutting machine which may comprises two rougher machines, two finisher machines, or a rougher and finisher combination. The machines A and B have work cutting stations 10 and 12 respectively, and the loader and transfer means 16 is positioned to operate between the two stations 10 and 12. In addition, a third station 24 is provided as a point for receiving new work blanks and as a place for returning finished workpieces. The third station 24 may receive work blanks from a conveyor means 26 which advances a new work blank to the station 24 before each transfer cycle. The same conveyor 26 can receive finished pieces which are transferred from station 12 at the end of each cutting cycle to station 24. It can be seen that each of the work stations 10 and 12 correspond to conventional positions for holding workpieces while a cutting operation is performed by rotating cutting means. The work stations are typically in the form of work spindles held in assemblies 28 and 30 which can be moved relative to the cutting means 14. Means for moving the work head assemblies 28 and 30 are not a separate part of this invention, but generally, means are provided for rocking each of the assemblies 28 and 30 from cutting positions, as related to the cutting machines A and B, to work transfer positions which would place the stations 10 and 12 directly beneath work holders carried by separate arms 32 and 34 of the work loader and transfer means. The work loader and transfer means 16 is oscillated back and forth about the vertical axis of its turret 18 so that arm 32 passes only between stations 10 and 12 and arm 34 passes only between stations 12 and 24. The third arm 36 passes only between the conveyor station at 24 and the first work cutting station 10. Thus, the separate arms 32, 34 and 36 can be provided with different types of work holding means having somewhat different structures and functions for handling workpieces at varying stages of completeness.

FIG. 3 is a view similar to FIG. 2 and shows the use of the loader and transfer means of this invention with a single gear cutting machine A. In this arrangement, only a single cutting station 10 is available to each workpiece, but a dummy, or banking, station 38 may be provided for holding workpieces until they can be advanced to the cutting station 10. After a cutting operation has been completed at 10, the workpiece is moved by the arm 34 to the conveyor 26 to be received and carried away. Thus, even in the case of a single machine operation, the loader and transfer means of this invention provides for an automatic handling of workpieces from a source of supply, through a cutting operation, and to a point where they can be delivered away from the cutting machines.

Figure 5:
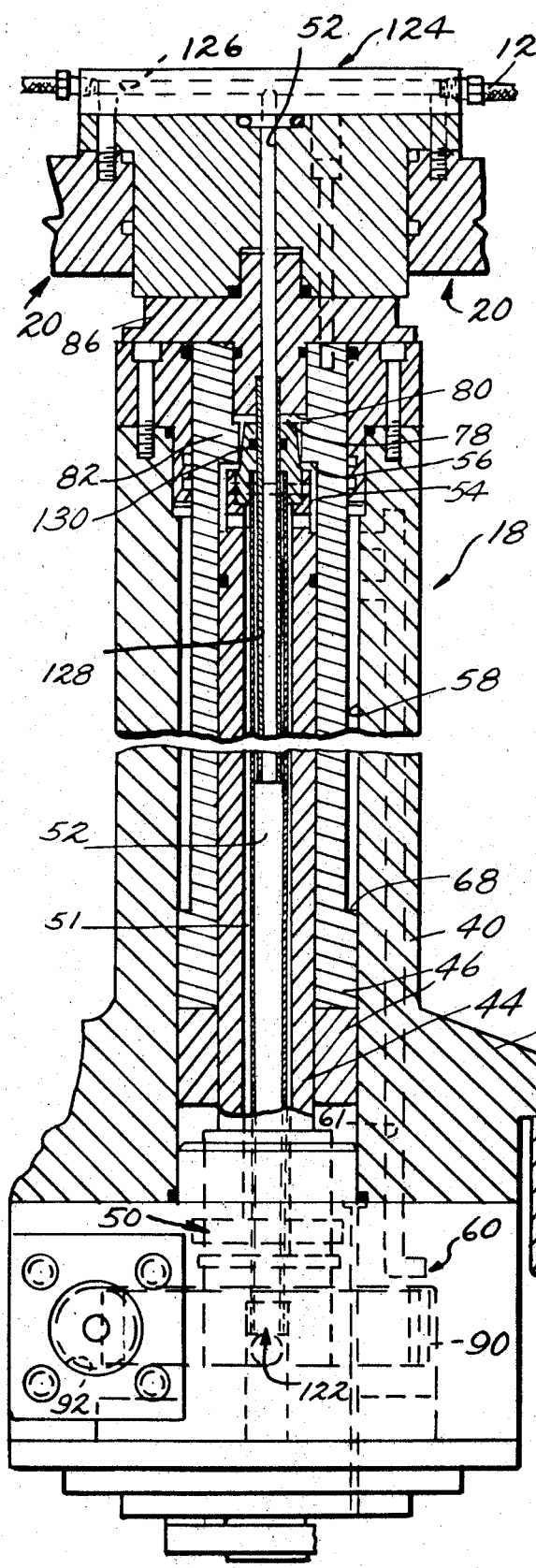
FIG. 5 is an elevational view, partly in cross section, illustrating a turret assembly associated with the work loader and transfer means of this invention.
Figure 6:
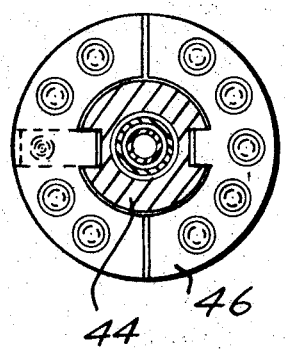
FIG. 6 is a cross sectional view of the turret assembly of FIG. 5 as seen on line 6—6 of FIG. 5.
Figure 7:
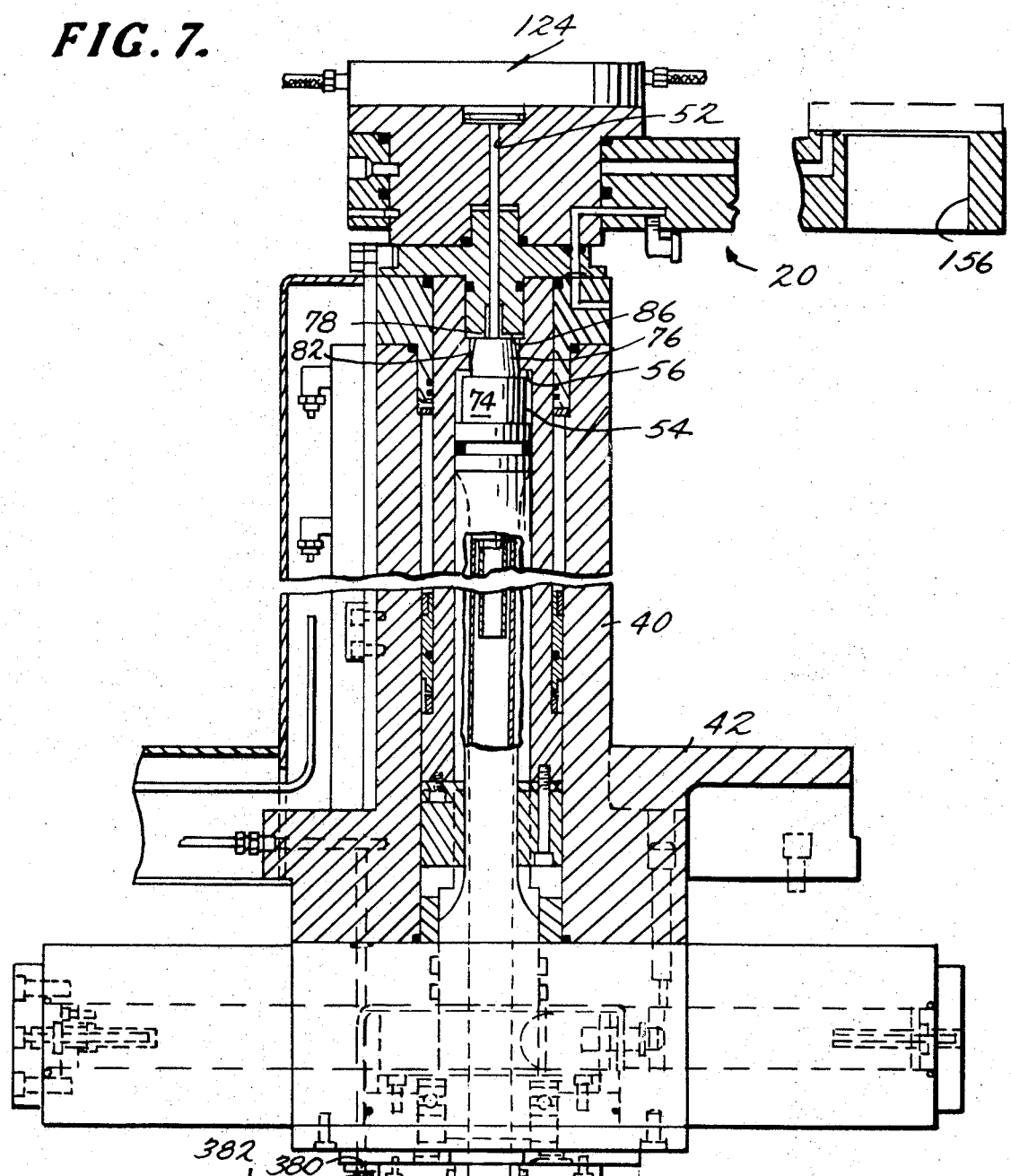
FIG. 7 is an elevational view similar to that shown for FIG. 5 but angularly displaced 90 degrees around the vertical longitudinal axis of the turret assembly.

FIGS. 4 through 8 illustrate details of construction of the work loader and transfer means 16. As shown in FIG. 4, separate arms 32, 34 and 36 are arranged 120° apart about a vertical central axis of th loader, and means are provided for attaching holding means to terminal end portions of the separate arms. Guide elements 39 may be provided on one or more of the arms to align the arms with an upstanding guide pin 41 fixed to a base or frame portion of the machine on which the loader is carried. The guide pin 41 assure a correct alignment of the loader 16 with separate work stations while the loader is being moved up and down to pick up or release workpieces. As seen in FIGS. 5–7, the turret assembly of the machine includes an outer cylindrical casing 40 which is affixed to a portion of the frame of a machine with which it is associated. As shown in FIG. 5, the casing 40 includes an integral base portion 42 which can be bolted to any convenient part of a machine base or frame. The casing 40 functions as a support for mechanisms which lift and lower and rotate the loader and transfer means. Concentrically positioned within a bore formed in the casing 40 are a drive shaft 44 and a lifting and lowering shaft 46. The drive shaft 44 functions to rotate the loader arm 20 back and forth about the central vertical axis of the turret 18, and the lifting and lowering shaft 46 includes a piston means to lift and lower the loader and transfer means in response to fluid pressure applied to the piston means. The drive shaft 44 and the lifting and lowering shaft 46 are tubular in construction so that they can be mounted concentrically relative to one another and to the turret tube 40. The drive shaft 44 includes a central bore which is divided into two fluid chambers by a tubular element 48. The tubular element 48 is spaced inwardly from the surface of the central bore of the drive shaft 44 so that hydraulic fluid can be admitted through an inlet 50 into an annular passageway 51 which is formed around the tubular element 48. A separate chamber 52 is defined by a bore through the tubular element 48, and this chamber is sealed from the annular passageway 51 around the element 48. The central chamber 52 receives a supply of hydraulic fluid from a separate source for ultimate use in activating holder means associated with the arms of the loader and transfer means. The flow of hydraulic fluid into the inlet 50 and around the tubular element 48 through passage 51 serves a purpose of lifting the loader and transfer means by an application of fluid pressure into a chamber 54 communicating with the annular passage 51 associated with inlet 50.

Considering the lifting and lowering system for the loader and transfer means, hydraulic fluid is admitted into the inlet 50 and through the passageway 51 for applying a pressure to an upper piston portion of the shaft 46. As shown in FIGS. 5 and 7, fluid which is introduced into the inlet 50 rises upwardly through annular passageway 51 of the turret assembly until it enters the chamber 54. Fluid pressure in the chamber 54 initially acts against a surface 56 which is formed on the lifting and lowering shaft 46, and this applies a lifting force to the shaft 46 and all associated parts as related to the fixed position of the inner drive shaft 44. A separate fluid chamber 58 is provided around the shaft 46 for driving the shaft downwardly with a separate fluid supply which is admitted at 60. When the turret assembly is being lifted, hydraulic fluid is admitted into the inlet 50 and fluid is exhausted from the annular chamber 58 by a reverse flow out of its inlet 60. The reverse takes place when the turret assembly is lowered inasmuch as hydraulic fluid is admitted into the inlet 60 and its associated annular chamber 58 while fluid is allowed to flow out of the chamber 54 and its associated inlet 50. Thus, the inlets 50 and 60 function as both inlets and outlets at different times of a lifting and lowering cycle. The means for admitting hydraulic fluid into either of the inlets 50 or 60 comprises conventional arrangements which include a source of hydraulic fluid, pumping means, and valving means for controlling direction of flow. The means for timing the flow of hydraulic fluid into and out of loader 16 may comprise the control system which will be discussed in a separate part of this specification.

Figure 9:
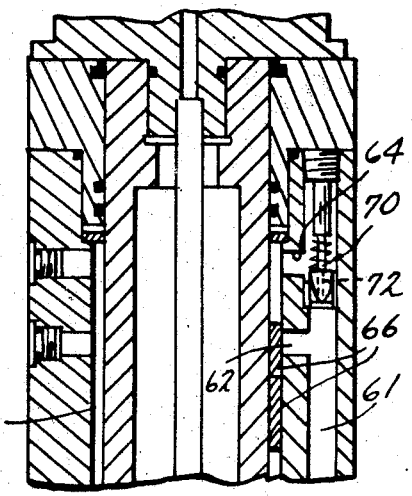
FIG. 9 is an elevational cross sectional view of an upper portion of the turret assembly, illustrating details of dash pot structures associated with vertical movements of the loader arms relative to the turret.

In addition to providing for a lifting and lowering of the loader and transfer means in response to application of hydraulic fluid, means are provided for dampening the lifting and lowering movements when they reach their upper and lower limit positions. For example, when the turret assembly is lifted by an admission of hydraulic fluid into the inlet 50, there would be an abrupt stopping of the turret upon reacting its uppermost position if means were not provided for dampening its upward movement. The means for slowing the upward movement of the lifting and lowering shaft 46 near its upper limit is shown in greater detail in FIG. 9. When the tubular shaft 46 is initially lifted, it is necessary that hydraulic fluid contained within the annular chamber 58 be allowed to escape from that chamber. However, hydraulic fluid can flow out of the chamber 58 only at an upper level of the chamber through a main outlet 62 or an alternate outlet 64. The outlet 62 is unrestricted and allows a free flow of hydraulic fluid out of the annular chamber 58 downwardly through the passageway 61 associated with the inlet 60 of the chamber 58. However, spacer elements in the form of sleeves 66 which can be contained within the annular chamber 58 are carried upwardly with the upward movement of the shaft 46 because the spacer elements 66 rest on an enlarged portion of the shaft 46 at 68. As the shaft 46 reaches its upper limit of travel, the spacer elements 66 block the free-flowing passageway 62, and this forces all remaining fluid in the chamber 58 to escape through the alternate passage 64. The alternate passage includes a restrictor valve 70 therein for restricting the flow of fluid downwardly through the valve and into the passageway 61. The restricting function of the valve 70 is provided by a very small bore 72 which limits the flow of fluid downwardly through the valve body. This restriction of flow of fluid substantially retards the final upward movement of the shaft 46 since hydraulic fluid cannot escape from the chamber 58 rapidly enough to allow continued rapid upward movement of the shaft 46. Thus, by the time the shaft 46 reaches its uppermost position, it has been dampened in its rate of travel by the dampening means just discussed.

When it is desired to lower the turret assembly, hydraulic fluid is admitted into the inlet 60 and its passageway 61 for a pressurized flow into the chamber 58. Inward flow of hydraulic fluid through the passageway 61 initially passes through the restrictor valve 70 in a reverse direction from what was discussed above, and it can be seen that the valve body can be displaced from its seated position for this reverse flow. This allows an easy admission of hydraulic fluid through the passageway 64 and into an uppermost part of the annular chamber 58, to initiate downward movement of the shaft 46. Of course, once the spacer elements have moved downwardly enough to open the passageway 62, the inward flow of fluid can also travel through that passageway. Initial downward movement of the turret assembly is also assisted by the weight of the loader and the arm elements carried by the shafts 46 and by a release of fluid pressure from the annular passageway 51 associated with the inlet 50. However, it is desirable to provide a positive downward displacement of the shaft 46 in order to rapidly and precisely move the transfer and loader means to its lowermost position, and therefore, hydraulic fluid is admitted into the chamber 58 for applying a downward pressure on the enlarged portion 68 of the lifting and lowering shaft 46. When the lifting and lowering shaft 46 approaches its lowermost limit, it is desirable to dampen the final movement of the shaft so as to cushion the lower limit stopping of the loader and transfer means. This dampening function is performed by a dash pot arrangement provided above the chamber 54. As shown in FIGS. 5 and 7, the chamber 54 is defined in part by a reduced cylindrical end portion 74 of the central drive shaft tube 44. This reduced end portion 74 remains fixed to the drive shaft 44 and does not lift and lower with the movements of the surrounding shaft 46. A further reduced end portion 76 is affixed to the end 74 so that when the lifting and lowering shaft 46 is lifted, the reduced end portion 76 remains at a fixed level. This means that hydraulic fluid which is admitted into the chamber 54 also flows past the reduced end portion 76 and into an upper chamber 78 so as to ultimately apply additional lifting force against the surface 80. Once the shaft 46 is at a sufficiently high level to provide wide clearance between the reduced end portion 76 and a corresponding reduced bore portion of the shaft 46, there is an easy flow of hydraulic fluid upwardly into the chamber 78. As shown in FIGS. 5 and 7, the reduced end portion 76 is tapered slightly so that it is of a smaller diameter at its upper level than it is at a lower level. This arrangement provides a varying restriction of flow of hydraulic fluid out of the upper chamber 78 when the shaft 46 is being moved downwardly. The shaft 46 includes an upper section 82 having a reduced diameter bore for receiving the reduced end portion 76. As the shaft 46 is lowered to its lowermost position, the bore portion of 82 approaches the upper end of the reduced end portion 76. At this point, there is a restriction of flow of hydraulic fluid out of the upper chamber 78 because it must escape past the end portion 76 in order to find its way downwardly into the chamber 54 and ultimately through the annular passageway 51. Thus there is an initial dampening of the downward movement as soon as any part of the portion 82 approaches the reduced end portion 76. However, the dampening effect is increased because of the tapered configuration of the end portion 76, and it can be seen that as more and more of the end portion 76 is received into the bore of portion 82, there is more and more restriction of flow of fluid past the reduced end portion 76. This restriction takes place when the loader and transfer means is near its lower limit position. Thus, there is provided a means for dampening both upper and lower limits of movement for the turret assembly.

As discussed above, the central drive shaft 44 does not raise and lower with the raising and lowering of shaft element 46. The central drive shaft 44 functions only to oscillate the loader and transfer means about a central vertical axis of the turret assembly, and this is accomplished by drive means included in the base of the turret assembly, as shown in greater detail in FIGS. 7 and 8. Rotational movements which are applied to the drive shaft 44 are imparted to the lifting and lowering shaft 46 because the two shafts are keyed together as shown in FIG. 6. This arrangement permits both shafts to be rotated but only the outer shaft 46 can be lifted and lowered. Of course, the outer shaft 46 carries all of the upper assembly elements which include the arms 20 and elements associated with the gripping and handling of workpieces as carried by the arms. All of the upper elements of the loader transfer means are bolted, or otherwise secured, to the shaft 46 by way of a plate member 86. The plate member 86 is lifted and lowered and rotated with all movements of the shaft 46.

Figure 8:
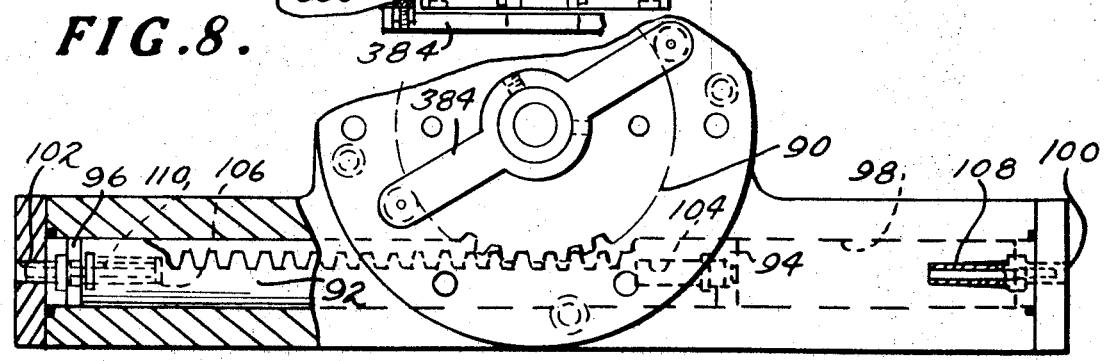
FIG. 8 is a plan view in partial cross section to illustrate a means for oscillating the turret back and forth around its central longitudinal axis.

Considering the means for rotating the drive shaft 44, reference is made to the details of FIGS. 7 and 8 wherein a rack and pinion drive arrangement is illustrated. A pinion gear 90 is affixed to a lower end of the drive shaft 44 in any well known manner so that rotational movements which are applied to the pinion gear 90 will be imparted to the drive shaft 44. A rack 92 is provided for precisely moving the pinion 90 back and forth about a central vertical axis of the turret assembly. The rack 92 is operated by a fluid pressure system which involves the alternate admission of hydraulic fluid to opposite ends of the rack 92. As shown in the drawings, the rack 92 includes cylindrical end portions 94 and 96 which are fitted within a cylindrical chamber 98 formed within the base assembly of the turret assembly. The cylindrical end portions 94 and 96 function as pistons within the bore 98, and the admission of hydraulic fluid into either of the inlets 100 or 102 will function to drive the rack in one direction or the other, depeding upon which inlet is receiving hydraulic fluid. The control system of this invention may be provided for supplying hydraulic fluid under pressure to the inlets 100 and 102 in an alternating sequence and at desired times, and means for pumping and controlling the direction of flow of hydraulic fluid from a source are well known in this art and do not form a separate part of this invention. In order to provide a dampening of the rack 92 at its two limit positions at opposite ends of the bore 98, the inlets 100 and 102 are of a special configuration to extend into the bore 98 for sufficient distances to be received within small diameter bores 104 and 106 provided in the cylindrical end portions 94 and 96 of the rack assembly. The inlets 100 and 102 are preferably in the form of tapered tubular elements 108 and 110 which provide a dash pot arrangement at each end of the rack 92 when the tapered elements 108 and 110 are received in their respective bores 104 and 106. It can be seen that when the rack is moved one way or the other, it is necessary to admit hydraulic fluid against one of the pistons 94 and 96 while at the same time releasing hydraulic fluid from an opposite end of the rack 92. The release of hydraulic fluid takes place by a reverse flow of fluid through one of the inlets 100 or 102, and as the rack reaches a limit position near the inlet from which hydraulic fluid is being released, there is a restriction of the rate of flow of fluid out of the inlet. For example, as the rack 92 approaches a lefthand position, as seen in FIG. 8, the tubular element 110 functions as an outlet for a release for hydraulic fluid from the chamber formed at that end of the assembly. However, as the end of the tubular element 110 is received within the bore 106 of the rack, it is necessary for all fluid to escape out of the chamber by travelling around the end of the tubular element and out through its central bore. Since the tubular element has a tapered configuration, flow of fluid around its outside surface becomes more and more restricted as the rack 92 moves closer and closer to the lefthand position. This provides a hydraulic fluid cushion at the end of the piston 96 which prevents an abrupt stopping of the rack at its limit position. The same action takes place when the rack is reversed for a movement to the righthand side of FIG. 8. Also, when movement of the rack is initiated in either direction, there is a slower rate of travel at the beginning of each movement until a tubular element has moved completely away from its associated bore.

The discussion so far has been concerned with means for applying lifting, lowering and oscillating rotational movements to the turret assembly 18 which includes the work handling and transfer arms 20. The arms 20 may comprise specific arms 32, 34 and 36 of the type discussed with reference to FIG. 2, and each of the arms may include a work holding means for gripping a workpiece while it is being transferred from one station to another. Thus, it is necessary to provide mechanisms and systems for operating the work holding means associated with each of the arms which are a part of the work handling and transfer means. Generally, the work holding devices are actuated by hydraulic fluid pressure, and the flow of hydraulic fluid is dictated by the same control system which dictates a flow of fluid into inlets 50 and 60 for applying movements to the turret assembly. However, the admission of hydraulic fluid to the work holder devices associated with each of the arms 32 through 36 takes place through the central bore 52 which passes up through the center of the turret assembly. The central bore 52 may have an inlet 122, and it can be seen that the bore passes up through the turret assembly to a distributor disc 124 carried at the top of the assembly. From there, hydraulic fluid can flow through separate passageways 126 to the separate arms associated with the loader and transfer means. Since the turret assembly moves up and down during normal work handling operations, it is necessary to provide a telescoping feature for the central bore 52 so that hydraulic fluid can be admitted to work holding devices for all positions of the work transfer and handling means. For this purpose, a separate tubular element 128 is affixed to the element 86 of the assembly so that it will be carried up and down with vertical movements of the assembly. Sealing gaskets 130 allow vertical movements of the tubular element 128 relative to the drive shaft 44 so that no leakage of hydraulic fluid will take place out of the bore 52. Thus, hydraulic fluid can be admitted to the inlet 122 at prescribed times to effect desired actuations of work holding elements carried near terminal ends of each of the arms associated with the handling and transfer means, and the flow of hydraulic fluid can take place irrespective of the vertical or rotational position of the arms 20.

As mentioned above, each of the arms 20 associated with any given loader and transfer device made in accordance with this invention may include a work holding device near its terminal end for engaging and gripping a work blank or a workpiece for movement from one station to another. When the work loader and transfer means includes three arms 32, 34 and 36 as shown in FIG. 2, it is possible to provide three different types of work holding devices for each of the three arms when the work handling and transfer device is being used in a dual machine having two work stations and a third station which supplies work blanks and receives finished pieces. The following discussion will describe a basic work holder device with reference to FIGS. 11 and 12, and modifications of the basic work holding device will be described with reference to FIGS. 13 through 16. The FIG. 11 type of work holding device is constructed to handle work blanks which have not been cut at all and which are to be transferred from a conveyor or other supply station to a first cutting station. Also, the basic device of FIG. 11 can be used to move rough cut pinion gear pieces from a conveyor or source of supply to a dummy or banking station of the type shown at 38 in FIG. 3. The second type of work holding device is shown in FIG. 13 and includes means to orient a hypoid pinion gear piece which has been previously rough cut. The orienting means comprise one or more pins which can be inserted into a spiral groove of the gear piece so that axial movement of the work holding device relative to the gear piece will result in limited rotation of the gear piece. This type of work holding device is utilized for handling rough cut gear pieces which are to be transferred to a finish cutting station. This transfer may be between a source of supply such as a conveyor and a first finish cutting station or between a dummy station and a single finishing station. The third type of work holding device, as illustrated in FIG. 15, includes means for orienting the workpiece very precisely in its movement from one finish cutting station to a second finish cutting station. This is very important when a hypoid gear piece is being only partly finish cut at one station and completed at a second station because each of the partly finished grooves must be carefully related to the cutter of the second station in order to obtain a precision gear product. The means for orienting the gear piece which are combined with the work holding device of FIG. 15 provide for a carefully controlled and adjusted orientation of a workpiece between cutting stations.

Figure 11:
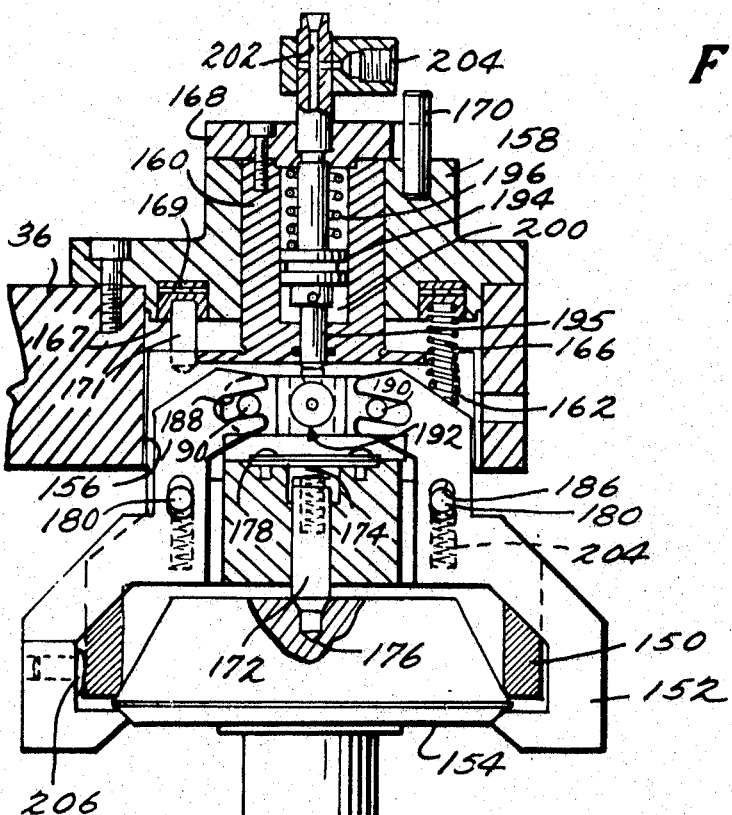
FIG. 11 is a detailed elevational view in partial cross section of a first type of work holding means associated with the loader and transfer means of this invention.

Referring to FIG. 11, each of the holding devices which are used with the present invention includes a centering cup means 150 and a pair of jaw members 152. The centering cup means is in the form of a metal cup having a downwardly depending annular lip for contacting the tapered surface of a gear piece, and the centering cup means functions to assist in a precise centering of a gear piece relative to the work holding means and to provide a continuous surface against which the workpiece may be tightly gripped. The jaw members 152 function to engage a lower surface or heel 154 of a gear piece and to draw the gear piece into tight engagement with the centering cup means 150. Each of the three forms of work holding devices which will be discussed includes the basic combination of a centering cup means and jaw members which can be moved relative to the centering cup and to a workpiece which is to be gripped in the work holding device. Prior arrangements which utilize only jaw structures do not provide a precise and reliable positioning of a gear piece for a transfer between stations, and further, prior arrangements have not been acceptable to high speed cutting machinery of the type contemplated by this invention because they have not provided for any compensation for the existence of burrs which may develop on the heel portion 154 of a gear piece during normal cutting of the gear piece. The three types of work holding devices which are presented by this invention provide compensation for the existence of burrs while at the same time providing a tight gripping of a workpiece so that rotation of a workpiece can take place while it is being moved from one station to another.

FIG. 11 shows the basic work holding device attached to the end of an arm 36 associated with a work handling and transfer device. The arm 36 may be manufactured from aluminum or an aluminum alloy, and a bore 156 is provided to the arm for allowing vertical movements of the work holding device relative to the arm. A mounting block 158 is affixed to the arm to carry all elements of the work holding device. The mounting block 158 has a bore formed through it which acts as a cylinder in which a jaw assembly holder 160 can move up and down. Suitable means may be provided for lubricating the cylindrical surface of the jaw assembly holder 160 for its movement within the mounting block 158. The jaw assembly holder 160 includes an enlarged lower portion 162 which carries the centering cup 150. The centering cup 150 may be secured to the jaw assembly holder by bolts 164. The combined jaw assembly holder 160 and centering cup 150 are resiliently mounted within the support block 158 by a number of spring means 166, which space the jaw assembly holder and centering cup downwardly away from the block 158. Opposite ends of the springs 166 are received into recesses in the support block 158 and in the lower portion 162 of the jaw assembly holder, and the spring means 166 are normally compressed to urge the centering cup 150 downwardly relative to the support block 158. The recess which is formed in the support block 158 is in the form of an annular channel which carries an annular ring member 167 for rotational movement relative to the annular channel. Bearing means 169 may be provided between the member 167 and the channel to reduce friction. A dowel 171 may be received in an annular ring member 167 so as to rotate the ring member when the jaws are rotated (as in the embodiment of FIGS. 13 and 15) and this prevents springs from being flexed out. The lower limit of travel of the jaw assembly holder 160 and its attached centering cup 150 is set by a top plate 168 affixed to the upper end of the jaw assembly holder 160. It can be seen that the top plate 168 is of sufficient size to contact an upper surface of the support block 158 when the centering cup is in its lowermost position. A pin 170 may be fixed into the support block 158 to prevent rotation of the jaw assembly holder and centering cup in the basic holding device of FIG. 11. Thus, the jaw assembly holder and its attached centering cup 150 are normally urged downwardly until the center cup 150 contacts the outside profile of a gear piece, and then, continued downward movement of the loader turret assembly to which the arm 36 is attached will compress the springs 164 so as to move the centering cup 150 upwardly relative to the support block 158. The centering cup 150 also includes a centering pin means 172 which is mounted for vertical movement against a spring 174 within a bore formed through the center of the centering cup 150. The centering pin means 172 functions to initially contact a recess formed in the center of a workpiece, and a tapered end 176 of the centering pin means aligns the workpiece with the centering cup means before actual contact of the centering cup with the workpiece takes place. The spring means 174 may comprise a relatively long helical spring which is mounted within a bore formed in the centering pin means, and a plate 178 can be secured to a top surface of the centering cup 150 to hold the spring means 174 in place.

Figure 12:
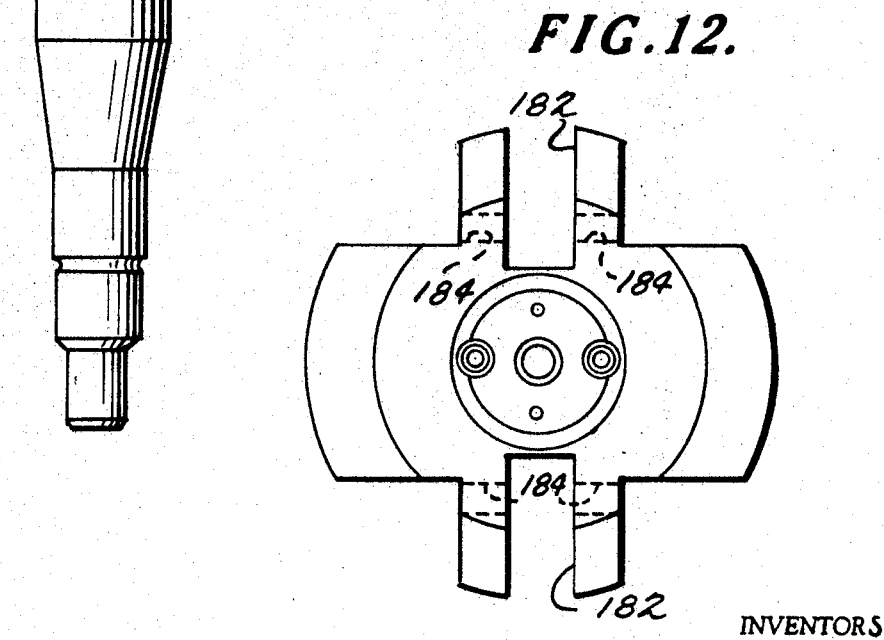
FIG. 12 is a cross sectional view taken on a horizontal plane on line 12—12 of FIG. 11, showing a portion only of the structure of FIG. 11.

The centering cup means 150 also functions to support a pair of jaw members 152 for movement relative to the workpiece and to the remainder of the work holder device. Each jaw member 152 is supported on a pin 180 so that it can be rocked about the axis of the pin. FIG. 12 illustrates slots 182 which are formed in the centering cup 150 to receive the downwardly depending jaw members 152, and the pins 180 are fixed relative to the centering cup 150 in bores 184. Each jaw member 152 includes an elongate slot 186 through which the pin 180 passes for supporting the jaw member. The elongate slot 186 functions to permit limited vertical movement of the jaw member relative to its associated pin 180. The two jaw members 152 are mounted so that they can be actuated into engaging and disengaging positions relative to a workpiece. Upper ends of the jaw members 152 include open slots 188 for receiving pins 190 associated with a jaw actuating mechanism. The pins 190 are carried at the ends of the yoke 192, and are fixed relative to the yoke, so that vertical movements of the yoke transmit rocking movements to the jaw members 152. Means for vertically moving the yoke includes a piston and rod assembly 194 which is fitted within a cylindrical chamber formed in the upper end of the jaw assembly holder 160. The piston and rod assembly 194 is normally urged downwardly by a spring means 196, and downward movement of the piston 194 to its lowermost position causes the jaw members 152 to be radially opened relative to the centering cup 150. It can be seen that downward movement of the piston and rod 194 moves the yoke means 192 downwardly to rock each of the jaw members 152 about its respective pivot pin 180, and this effects a radially outward movement of the jaw members from the positions shown in FIG. 11. The piston and rod assembly can be attached to the yoke means 192 in any suitable manner, however, it is preferred that the rod 195 of the piston and rod assembly 194 be secured to the yoke means by a swivel nut assembly which permits limited rocking motion of the yoke means about an axis which is perpendicular to the view shown in FIG. 11. This preferred arrangement allows the yoke means to rock and to effect radial movements of the two jaw members 152 even if one of the jaw members is positioned at a slightly lower position than the other, such as might happen if one of the jaw members engages a burr on the heel of a workpiece. Thus, there is provided a compensation for the existence of burrs on the workpieces, and the compensation does not affect the true centering of the workpiece with the centering cup means 150 and the tight engagement of the workpiece with the annular lip of the centering cup means. As just discussed, downward movement of the yoke means, nad resulting opening movements of the jaw members 152, are effected by the helical spring means 196. Upward movement of the yoke means 192, and resulting closing movements of the jaw members 152, is accomplished by the admission of hydraulic fluid into a chamber 200 formed beneath the piston 194. Hydraulic fluid may be admitted into the chamber 200 through a bore 202 formed through the center of the piston and rod means 194, and the bore 202 can communicate with a fluid pressure line connected to the opening 204 and to one of the passageways 126 formed in the distributor disc 124 (see FIGS. 5 and 7) of the loader and transfer device.

Means for admitting and releasing hydraulic fluid to and from the chamber 200 may include conventional pumping and supply means associated with a control system which will be discussed in a later portion of this specification. The control system provides for an admission and release of hydraulic fluid to and from the chamber 200 in accordance with a timed sequence and in accordance with whether a workpiece is to be gripped or released relative to the holding device.

Considering now the use and operation of the basic holding device shown in FIG. 11, it can be appreciated that when the holding device is in an unactivated condition, the jaw members 152 are in open positions because the spring 196 urges the yoke 192 downwardly. When it is desired to pick up a workpiece for transfer to another station, the arms 20 which carry the work holding devices are rotated so that the work holding devices are centered over the tops of workpieces to be picked up and transferred. Then, the loader assembly is activated to lower the arms for a contact and engagement of each work holding device with each piece which is to be picked up. Initially, each work holding device contacts the workpiece by its centering pin 172, and the centering pin 172 assures a precise centering of the workpiece prior to contact by the centering cup 150 and the jaw members 152. This initial contact is made when the loader and transfer assembly 16 is activated to lower all arms, and continued lowering of the device brings all centering cups 150 into engagement with the tapered surfaces of all workpieces. Still further lowering of the arms and of the work holding devices attached to the arms compresses each centering cup 150 upwardly towards its support block 158, and when the loader assembly reaches its lowermost position, the jaw members 152 can be activated to move radially inwardly to engage a heel 154 of the workpiece. The jaw members 152 are activated by introducing hydraulic fluid through the conduit 202 and into the chamber 200, thereby lifting the piston and rod assembly 194 and the yoke 192. Separate spring means 204 are provided in channels formed in each of the jaw members 152 to bear against the pins 180 so as to normally urge the jaws downwardly in a direction which places each pin 180 at the uppermost limit of movement of its slot 186. Thus, when the jaw members 152 are initially moved by the admission of hydraulic fluid into chamber 200, they pivot about the pins 180 with the pins 180 being positioned at the upper ends of the jaw slots 186. The jaw members 152 move radially inwardly during this initial movement until they contact a heel portion of the workpiece or until they are stopped by limit pins 206. At that point continued application of fluid pressure in chamber 200 causes a continued lifting of the yoke 192, and since the jaws 152 can no longer move radially inwardly they are lifted upwardly by the yoke member by a movement of the elongate slots 186 relative to the fixed positions of the pins 180. Thus, the slots 186 provide for an initial pivoting movement of the jaws which moves them radially inwardly to contact a workpiece, and then, the jaws can be drawn upwardly to tightly engage and grip the workpiece against the centering cup 150. In addition, the provision of the elongate slots 186 for mounting the jaws on their respective pins 180 allows one jaw to move upwardly for a shorter distance than another, and this may happen when one of the jaw members engages a burr at its point of contact with the heel 154 of a workpiece. After the jaws are fully gripped, the work loader and transfer device can be activated to lift all engaged workpieces upwardly out of their stations for movement to new stations. The work loader and transfer turret is rotated only when it is in an uppermost position, and then, it is lowered again to drop the workpieces into their new stations. When it is desired to release a workpiece from the grip of a work holding device, fluid pressure is released from the chamber 200 by a control system, and the spring 196 presses the piston and rod assembly 194 downwardly. Since pins 180 of jaws 152 are near lowermost positions of the elongate slots 186, initial downward movement of the yoke 192 does not function to pivot the jaw members, but rather, it functions to move the jaw members axially downwardly for a short distance. Then, the jaws can pivot about the pins 180 to move radially outwardly away from the workpiece to release the workpiece from a gripping relationship with the centering cup 150. Then, the work loader and transfer turret can be lifted again and rotated in a reverse direction to place each work holding device in a position to pick up pieces in a subsequent cycle.

The separate type of work holding device shown in FIGS. 13 and 15 represents modifications of the basic device shown in FIG. 11. For purposes of manufacturing convenience, most of the elements of the separate handling devices are identical, but in the devices shown in FIGS. 13 and 15 additional mechanisms are provided for rotating a workpiece while it is being handled by the holding device. The holding device which is shown in FIG. 13 includes one or more pin members 210 which are resiliently mounted in blocks carried by the cup 150 so as to enter the spiral grooves of a pinion gear piece which has been previously rough cut. The pin members 210 function to rotate the workpiece slightly while it is being contacted by the downward movement of the holding device, and it can be appreciated that downward movement of the pins 210 in a curved groove will effect a slight rotational movement of the workpiece. This type of holding device is used when work is being transferred from a conveyor or from a dummy station to a machine where finish cutting is to be effected. Such work is in a condition of having spiral grooves rough cut into its tapered surface. Since the individual workpieces which are carried in a conveyor are not oriented in any particular way, it is necessary to properly orient each workpiece about its vertical central axis so that the rough cut grooves are in proper orientation for being finish cut when they arrive at a cutting station. The general operation of the work holding device shown in FIG. 13 is one of moving the work loader and transfer device 16 downwardly so that the holding device of FIG. 13 can make contact with a rough cut piece at a source of supply or at a dummy station. During the downward movement of the work holding device, the pins 210 enter spiral grooves at some point during their downward travel along the tapered surface of the gear piece, and then, continued downward movement of the holding device effects a final rotation of the workpiece which places each workpiece in the same angular position relative to the holding device. Then, the work loader and transfer device 16 is lifted and rotated to a new station, and the workpiece is lowered and released at the new station for a finish cutting operation.

Each of the pins 210 may be mounted in a bearing sleeve 212 carried in a block attached to the centering cup 150 so as to be easily movable along a central longitudinal axis of the pin. In addition spring means 214 are provided to normally urge the pins radially inwardly toward a workpiece. The view which is shown in FIG. 13 is distorted to the extent that portions of jaw members 152 are shown in the same plane as the centering pins. This is done to show all elements of the holding device, but in actual practice the jaw members 152 are angularly displaced around the center axis of the device so as to avoid interference with blocks supporting the pins 210. The pins may be modified to include means (not shown) for providing an air read-out of whether they have reached fully inserted positions in the grooves of a workpiece. Such means would include an air passageway which would be blocked only if the pin were properly seated at the bottom of a groove formed in a workpiece, and the blocking of the air passageway could be used as a check in the type of control system which will be discussed later in this specification.

FIG. 14 illustrates a means for manually adjusting the angular position of the holding device of FIG. 13 in a loader arm generally indicated as 20. The manual adjustment means 216 includes a slide block 218 which can be moved longitudinally back and forth along a channel 220 formed within the support block 158. The slide block 218 includes an upwardly projecting shaft 222 which engages the top plate 168 to rotate the top plate and all elements attached to it. The top plate 168 has been modified for the FIG. 13 type of holding device to include recess means for receiving the projecting shaft 222 of the slide block. Movement of the slide block 218 is effected by turning a knob 224 to rotate a threaded shaft 226 relative to the slide block 218. The threaded shaft 226 is received within a threaded bore of the slide block 218, and very precise placement of the slide block 218 can be achieved. A lock nut 228 may be provided for locking the slide block in any adjusted position. With the adjustment means 216 it is possible to rotate the position of the pins 210 so that they are positioned in a precise location for indexing a workpiece. An adjustment of the pin positions can be made by lowering the holding device of FIG. 13 over a properly placed workpiece at a cutting station and aligning the pins with the grooves of the workpiece.

The holding device of FIG. 13 can be further modified to provide adjustment screws which limit the downward movement of the plate 168 relative to the support block 158 so that a precise downward limit for the centering cup 150 can be achieved. Since the pins 210 are carried by blocks mounted on the centering cup 150, it is important to set the exact level to which the pins 210 may move downwardly so that a known and precise degree of rotation for each workpiece will take place. By limiting the downward movement of the centering cup 150, it is necessary to allow each workpiece to drop for a short distance as it is being released from the grip of a holding device into a work spindle at a new station. This short distance of dropping of a workpiece assures a good seating of the workpiece in a spindle, and a final increment of rotation of the workpiece takes place by the action of the pins 210.

FIGS. 15 and 16 illustrate a third type of holding device which may be utilized between two stations which operate to finish cut a pinion gear piece. In this type of operation, it is necessary to very precisely orient the workpiece after a first finish cut operation has been performed on it, and for such operation the type of structure shown in FIG. 13 is not sufficiently reliable to accurately place a workpiece at a second station for a second finish cutting operation. Of course, the workpiece is being moved by 120° from one station to another with a work loader and transfer device of the type shown in FIG. 2 wherein each of the arms 32, 34, and 36 is placed 120° apart from the others. However, the 120° displacement of a workpiece from one station to the next is not sufficient to precisely position the previously cut piece relative to a second cutter at the second station. The work holding device of FIG. 15 is constructed to provide for a carefully adjusted rotation of a workpiece while it is being transferred from one station to another. Basically, the work holding device of FIG. 15 includes the same centering cup and jaw actuating mechanism as described for FIGS. 11 and 13, and in addition, there is provided a means for automatically rotating the top plate 168 relative to the support block 158 carried by the arm 32. In the FIG. 15 embodiment, the support block 158 has a reduced diameter end portion 232 which is sufficiently small to allow downwardly depending pins 234 and 236 to move around it. The pins 234 and 236 are fixed to the top plate 168. A spring biased shaft 238 is carried within a cylindrical structure affixed to a portion of the support block 158 or of the arm 32 so that the shaft 238 can move in and out of the cylindrical structure 240. A spring 242 is compressed within the cylindrical structure 240 to bear against an enlarged end 244 of the shaft 238 so as to urge the shaft 238 against the pin 234. Thus, it can be seen that the rod 238 normally functions to rotate the plate 168 in a counterclockwise direction as viewed in FIG. 16. Counterclockwise movement of the plate 168 is limited by an upstanding pin 246 fixed into the support block end portion 232. The plate 168 is formed with a reduced diameter portion at 248 to permit limited rotation of the plate 168 relative to the stop pin 246. Rotation of the top plate in a clockwise direction is achieved by moving a rod 250 against the pin 236. The rod 250 is fitted within a bore so as to function as a piston when hydraulic fluid is introduced into the chamber 252 by way of a conduit 254. The conduit 254 is preferably placed externally of the arm structure 32 and receives an admission and release of hydraulic fluid at the same time as passageway 202 associated with actuation of the jaw members of the holding device. Thus, when the passageways 202 and 254 are pressurized with hydraulic fluid from a source, the jaw members 152 are locked into a gripping engagement with a workpiece, and the pressure of fluid in the chamber 252 attempts to rotate the entire work holding device relative to the workpiece. However, normal sequencing of a work transfer operation requires that a workpiece be held in its work spindle in a chucked condition until full engagement of the jaws 152 has been accomplished. Then, the workpiece is dechucked from its work spindle, and the work holding device is rotated by movement of the rod 250 as the entire turret assembly of the work loader and transfer means is being lifted away from the station where the workpiece is received. The amount of clockwise rotation movement of the plate 168, and all of the work holding elements attached thereto, is limited by a stop nut 256 carried at a trailing end of a small diameter rod 258 which is threaded into a central bore of the piston rod 250. A cylindrical dial member 260 can be rotated relative to its supporting sleeve 262 to effect a threading and unthreading of the small diameter rod 258 into and out of the piston rod 250. The dial 260 is operatively connected to the rod 258 by a pin 264 which rides in a slot formed along the length of rod 258, and thus all turning movements of the dial 260 result in axial movements of the piston rod 250. The piston rod is prevented from turning by a pin 265 which rides in a slot formed into the surface of the piston rod. When it is desired to adjust the length of stroke of the piston rod 250, hydraulic pressure is applied to the chamber 252 so that the piston rod 250 moves tightly against the pin 236. Then, the dial 260 is rotated to advance or retract the actual position of the end of the piston rod 250 to change the position of the pin 236, and this adjustment can be made in accordance with readings provided by instruments attached to a machine or in accordance with known placements of workpieces at a work station. Once the desired adjustment is accomplished, hydraulic fluid can be released from the chamber 252, and at that point the spring 242 of the opposing rod 238 will urge the plate 168 in a counterclockwise direction which will move the piston rod 250 back into its bore until the plate 168 contacts the pin 246 at 266. This will cause the rod 258 to move to the right, as seen in FIG. 15 and a gap will appear between the stop nut 256 and the shoulder of the dial member 260. The gap which appears corresponds to the amount of movement which has been set for the piston rod 250 when hydraulic fluid is once again introduced into the chamber 252. The shoulder 268 on the plate 168 does not function as a limit which engages the pin 246 and is only designed to provide sufficient clearance for all contemplated adjustments of rotation for the plate 168. A set screw 270 may be provided in the supporting sleeve 262 to set the rotational position of the dial 260 and of the rod 258 once a desired setting has been achieved.

The type of holding device which is shown in FIG. 15 also includes a slight modification in the centering cup 150. The centering cup 150 is provided with a number of spring urged pins 272 which have sharpened points for contacting and indenting the surface of a workpiece to fix the position of the workpiece relative to the entire work holding structure. This additional feature is provided because of the precision that is required in rotating the work holding device, and it is important to make sure that the workpiece does not move relative to the work holding device while rotation of the workpiece is taking place. Thus, it can be seen that means have been disclosed in the FIG. 15 embodiment to provide an automatic stock division of work while a workpiece is being transferred from one station to another and this stock division indexing can be achieved with great precision.

Control apparatus for checking and controlling sequential machine operations

FIGS. 17 through 23 illustrate structural features associated with a control system 300 which functions to control and check sequential operations of a machine. In particular, the control system provides for an automatic checking of a number of steps of machine operation to determine whether each of the steps has been completed so that the machine can be automatically shut down if any given step is incomplete. This type of control is very important in machinery which can perform a complex series of operational steps but which must fully complete certain steps before going on to additional operations. Although the control system 300 has specific utility in bevel gear cutting machines of the type discussed above, it can be appreciated that it is useful in any machine which operates through a series of sequential steps.

Figure 17:
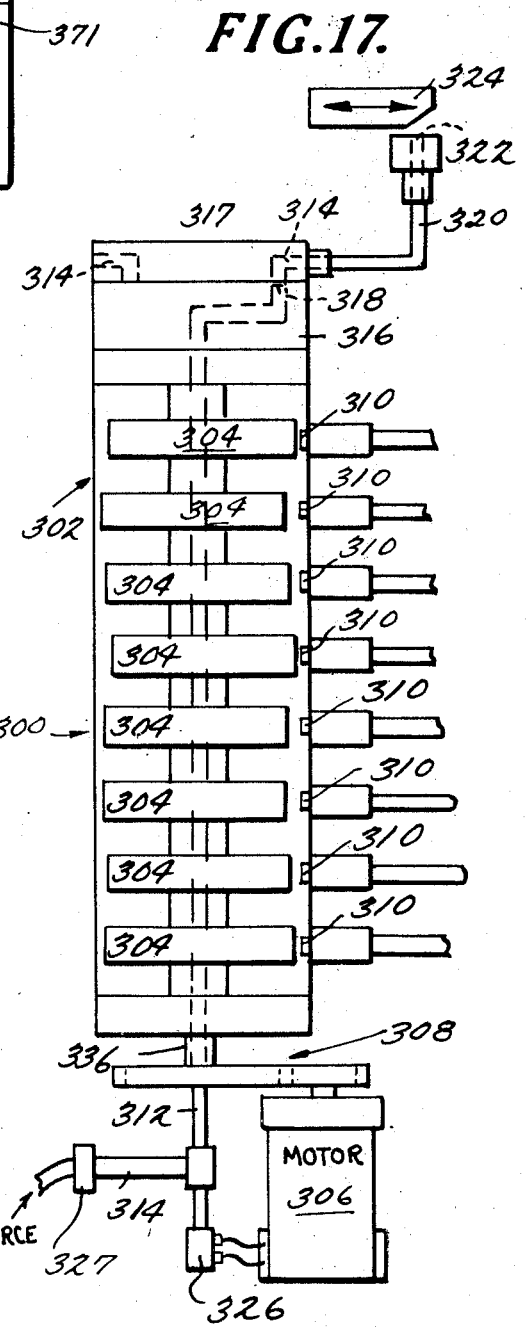
FIG. 17 is a vertical schematic layout of functional features associated with a control system of this invention.

FIG. 17 schematically illustrates the basic components which are included in the control system 300. A control drum 302 carries a plurality of control elements 304 for dictating certain operational steps to be performed by a machine. Rotation of the drum 302 by a motor means 306, and through a drive train 308, causes each of the control means 304 to dictate a function of the machine at a prescribed time which is related to the rotation of the drum 302. Each control means 304 may be any form of device which can be brought into and out of operative condition for dictating control functions of a machine, and FIG. 17 illustrates the control means 304 as comprising cam discs which can actuate switches 310 in accordance with the peripheral profile of the cam discs and in accordance with the degree of rotation of the entire control drum. The switch means 310 may function to signal the actuation of valves or other devices which initiate specific operational functions of a machine. Thus, as the control drum 302 is rotated by its motor 306, the switch means 310 are brought into operative condition in accordance with a sequence dictated by the rotating cams 304. This control system also includes means for checking any desired number of operational steps of the machine to determine whether each such step has been completed. This means includes an air read-out system which supplies compressed air, or other gas, to a conduit 312 from a supply line 314. The source of compressed air can be any known and suitable source for maintaining the line 312 under a given pressure. The conduit 312 communicates with a distribution block 316 to become aligned with any one of a number of separate passageways 314 which are formed in a manifold head 317. The manifold head 317 remains fixed while the remainder of the drum 302 and the distributor 316 are rotated by the motor 306, and thus, an outlet end 318 of the conduit 312 is brought into alignment with each passageway 314 for forming a communication to air read-out lines 320 associated with each of the passageways 314. Each air read-out line 320 includes a terminal outlet 322 which is related to a moving element 324 of the machine in such a way that the moving element 324 completely blocks and seals the outlet 322 when the moving element 324 has reached an intended position during a step of operation of the machine. By providing any number of passageways or conduits 320 for a machine, it is possible to detect the completion of movement of any number of moving elements associated with the operations of the machine. This read-out system is completely reliable and eliminates a need for switching devices located at a great number of positions about a machine to detect the movement of elements. Once the drum 302 has rotated to a position to align the conduit 312 with one of the read-out conduits 320, compressed air can flow from the source to the read-out point 322. Included in the compressed air system is a pressure switch 326 which is in open communication with the conduit 312 so as to take a pressure reading of air pressure in the conduit 312. The pressure switch 326 is of a known type which completes an electrical circuiting to the motor 306 when a certain level of pressure is detected, and such a switch is a commercially available item known to the industry. When pressure of air within the conduit 312 rises above the prescribed level, the switch 326 functions to close an electrical circuit to the motor 306 so that the motor is operated to rotate the drum. Then, the drum is automatically stopped, by a separate switching mechanism, when it reaches the next read-out station, and this permits the next read-out to activate the pressure switch 326. Thus, it can be seen with the system which has been just described that a complete blocking of any given read-out point 322 is necessary before air pressure can build up within the conduit 312 to a sufficient level to allow continued operation of the motor 306. If a complete blocking of an outlet 322 does not take place air escapes from the outlet 322 and pressure in the entire conduit is reduced below a level which will operate the pressure switch 326. Another advantage of this system is that a failure of operation can be easily detected by the sound of air escaping at a given read-out point on the machine. A fixed restrictor 327 may be provided in the air supply line 314 to prevent a rapid backup of air pressure to the source of supply when a read-out is being taken. Also, the restrictor 327 permits the conduit 312 to become pressurized more rapidly with a relatively low pressure source of supply.

Figure 18:
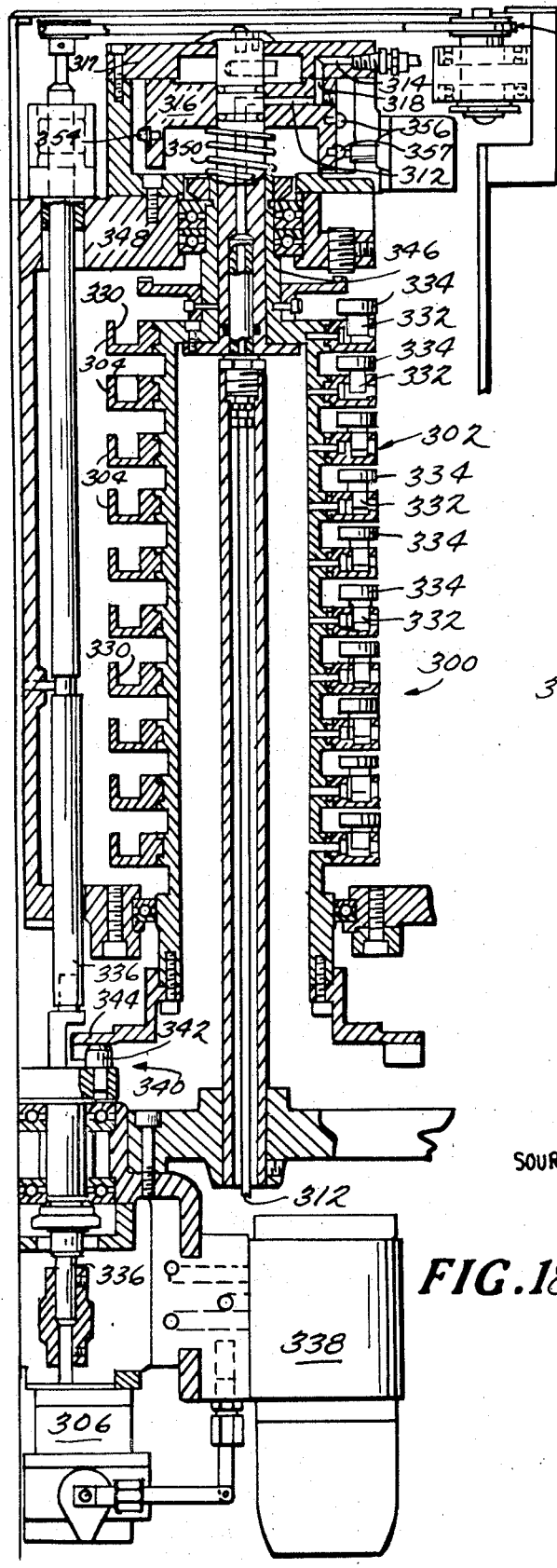
FIG. 18 is an elevational view in cross section, showing details of structure of a control system in accordance with this invention.
Figure 20:
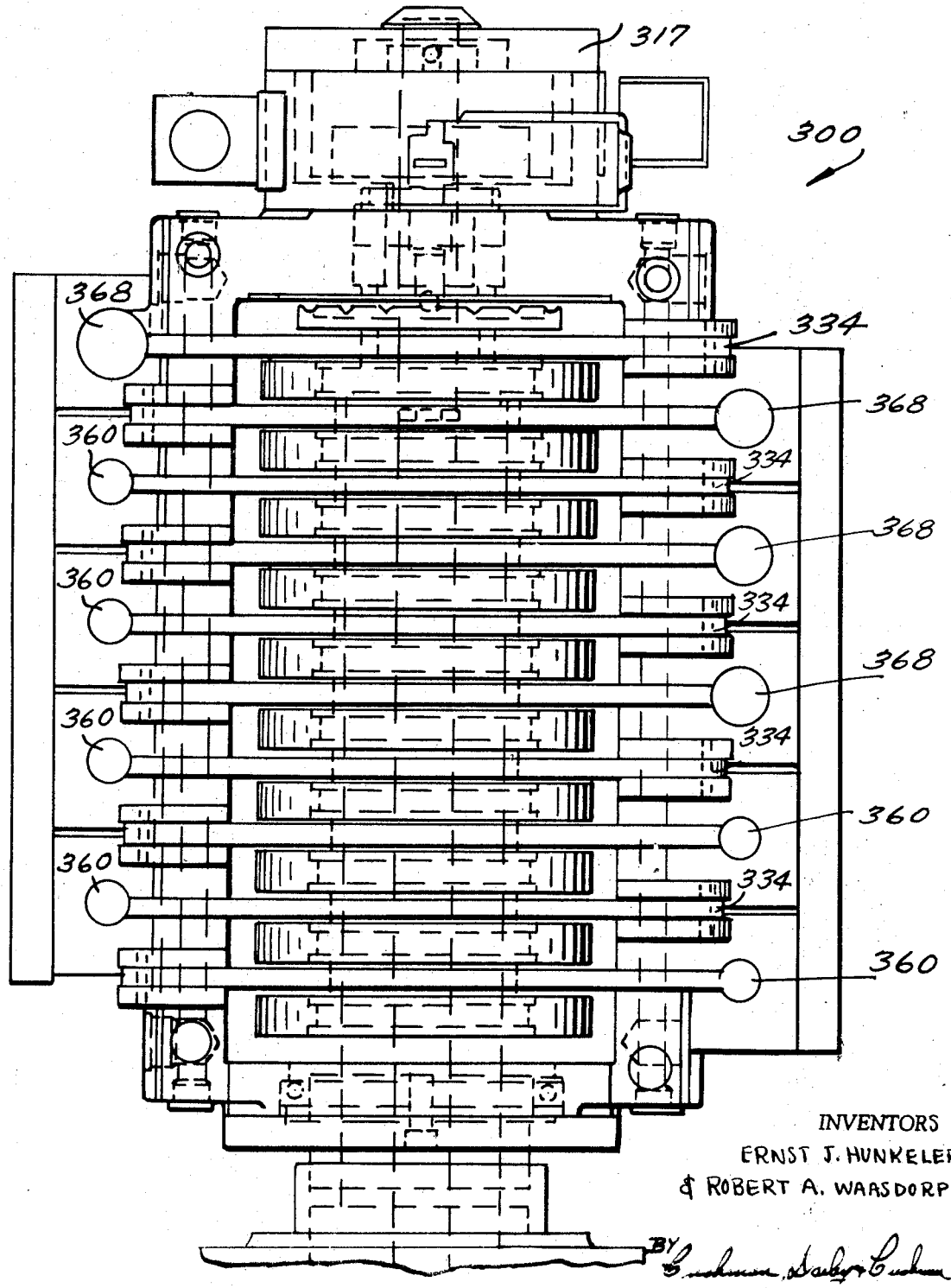
FIG. 20 is a front elevational view of the same system shown in FIG. 19.
Figure 21:
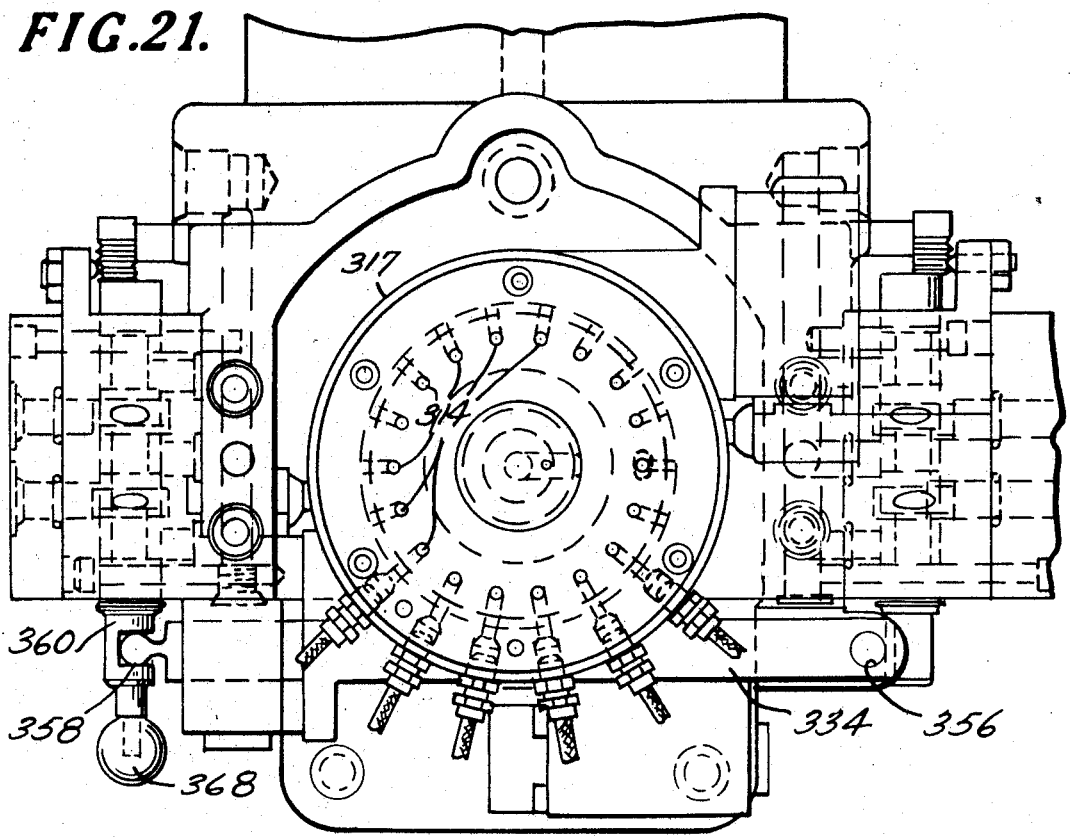
FIG. 21 is a cross sectional view taken in a horizontal plane to show features of the control system on line 21—21 of FIG. 20.

FIGS. 18 through 23 illustrate details of a specific embodiment of the control and checking system shown in FIG. 17, and the specific embodiment is of a type which may be used with a loader and transfer device, as discussed above. In the FIG. 18 view, the control drum 302 is illustrated as being made up of a number of cam means 304 which are stacked on a common axis of rotation of the drum. The cam means 304 may comprise cams having closed-path cam surfaces 330 which receive followers 332 for dictating movements to lever arms 334. The entire control drum 302 together with all of its cam means 304 is mounted for rotation about its central vertical axis. Means for rotating the drum may include a motor 306 which is drivingly connected to an input shaft 336. The motor 306 may be a hydraulically actuated gear motor which is controlled by a solenoid control 338. A known motor of this type is available commercially. Hydraulic fluid from a suitable source of supply drives the motor 306 and its drive shaft 336 to rotate a conventional geneva index mechanism indicated generally at 340. The geneva index mechanism includes a pin 342 which intermittently engages a slot of an annular member 344 to index the annular member in an intermittent way while the pin 342 is being continuously rotated about the axis of the drive shaft 336. This mechanism is conventional per se and is included to intermittently stop and start the control drum in accordance with a series of air read-outs which are to be taken by the air read-out system associated with the control drum. The geneva index mechanism allows separate switching to stop normal rotation of the drum at the same time that an air read-out is being taken so that no further control functions will be dictated until the read-out indicates that a step of operation has been fully performed. It can be seen that the annular member 344 is rigidly secured to the main body of the drum 302 so that movements of the annular member will be imparted to the drum. An upper end 346 of the drum 302 is mounted in bearing structures so that the drum can rotate relative to housing structure 348. The air read-out system which is provided in the embodiment of FIG. 18 is essentially identical to that described for FIG. 17 except that it functions to actuate the solenoid 338 to control the motor. Conduit 312 passes up through the center of the drum so as to communicate with an air distributor 316 which is secured to the upper end 346 of the drum to rotate therewith. The air distributor may be mounted relative to the drum so as to be movable axially along the longitudinal axis of the drum, and a spring 350 urges the air distributor 316 into tight engagement with a fixed manifold plate 317. The manifold 317 includes any desired number of radially disposed passageways 314 for being aligned with the single outlet 318 of the air distributor 316. A typical arrangement for the manifold plate 317 is illustrated in FIG. 21 wherein eighteen read-out passageways 314 are indicated. The air distributor 316 also carries three levels of switch actuating means 354, 355, and 357 which function to initiate certain operational cycles of the gear cutting machine, and these will be discussed in greater detail below.

Figure 22:
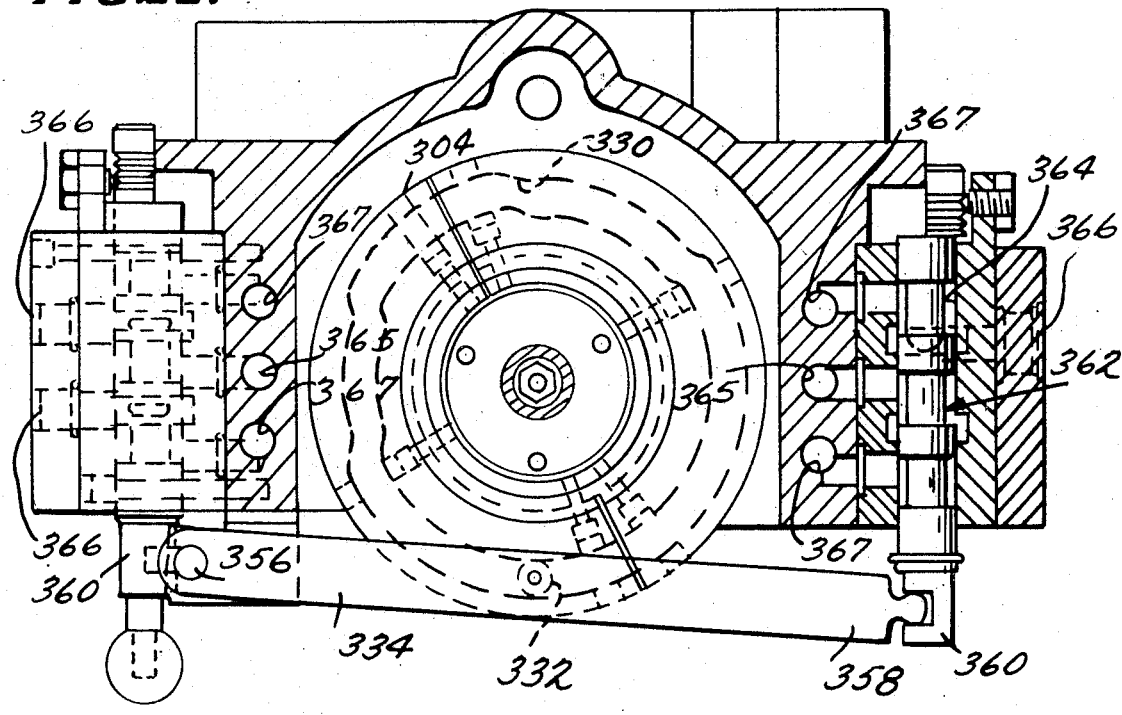
FIG. 22 is another cross sectional view similar to that shown in FIG. 20 but taken on line 22—22 of FIG. 20.

As shown in greater detail in the side view of FIG. 19, in the front view of FIG. 20, and in the cross sectional plan view of FIG. 22, the followers 332 function to move lever arms 334 about fixed pivot points 356 so as to move a free end 358 of each lever arm. The free end of each lever arm is operatively connected to the end 360 of a valve body 362, and movement of the end 358 of the lever arm towards and away from the front of the control drum effects a reciprocal movement of the valve body 362 in a bore 364. The valve body 362 functions to control the flow of hydraulic fluid through passageways 366 to a particular operating mechanism of the loader and transfer device. Passageways 365 function to supply hydraulic fluid under pressure to the system, and passageways 367 function as exhaust ports. The valve body 362 is designed to alternate pressurized flow to opposite ends of pistons associated with working members and to allow a reverse flow when necessary to accommodate such alternating movements. It can be seen from the FIG. 20 view that two rows of valve bodies are stacked relative to one another on opposite sides of the control system 300, and the individual lever arms 334 which actuate the separate valve bodies are alternately pivoted on opposite sides of the stack. Certain of the valve bodies may be provided with external knobs 368 which allow a manual movement of the valve to override or complete any given control function. In addition, a manual control handle 369 (FIG. 19) is operatively connected to the drive shaft 336 to permit a manual rotation of the control drum when desired. The handle may be connected to the drive shaft 336 by a belt and pulley arrangement 371 as shown in FIG. 18.

FIG. 23 is a cross sectional view of the distributor plate 316 and illustrates additional switching devices associated with the control system of this invention. One level of projecting elements 354 functions to actuate a drum index stop switch 370, and these projecting elements may be provided for any or all of the read-out points to be taken during the rotation of the control drum. As discussed above, the separate switching means 370 functions to de-activate solenoid 338 to periodically stop the drum, and the drum is restarted only when an air-read-out activates the pressure switch. At a second level of the distributor disc 316, there is a single projecting element 355 which functions to contact a cutting cycle start switch 372. The cutting cycle start switch 372 initiates a cutting cycle of a gear cutting machine and this switch is actuated once for each complete rotation of the control drum (since the control drum is intended to control and check functions of the loader and transfer means which operates between cutting cycles of the machine). Finally, there may be provided at a third level, a projecting member 357 for contacting a chamfer start switch 374 which initiates the operation of a chamfering unit associated with a gear cutting machine.

The control system which has been just described is intended to dictate and check control functions for the loader and transfer means discussed in an earlier part of this specification. It can be seen that as many control functions and read-outs as may be desired can be provided by changing the number of cam means 304 and by changing the number of air read-out passageways 314 in the manifold plate 317.

Figure 24:
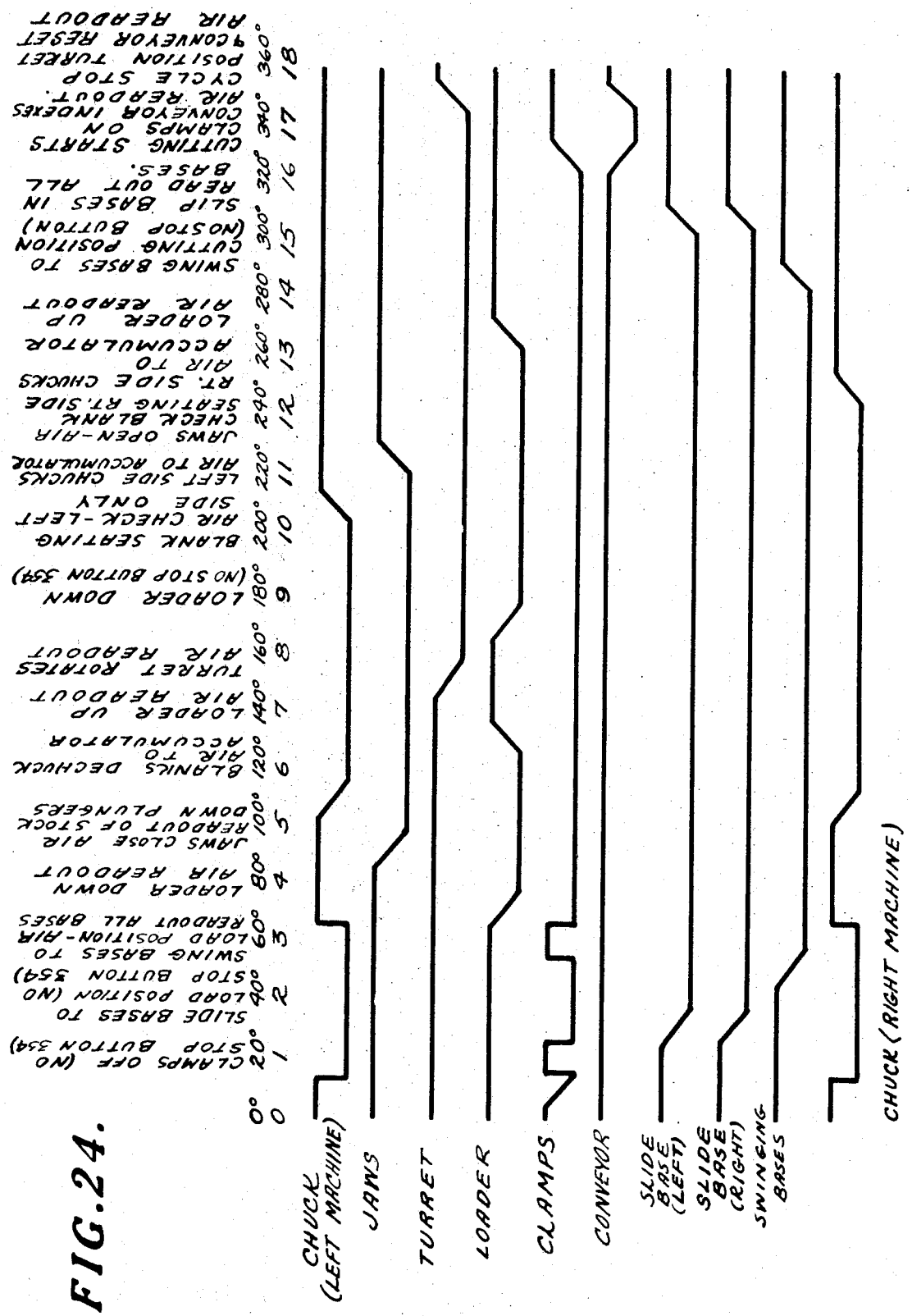
FIG. 24 shows an example of a sequential pattern of operations which can be controlled by the control system of this invention when utilized in a gear cutting machine of the type shown in FIG. 1 wherein finishing cutting operations are being carried out on gear workpieces.

FIG. 24 illustrates a program of control and checking which is attainable with the control system which has been just discussed. FIG. 24 is a repreesntative example of a program for operating a loader and transfer device in combination with two finishing machines arranged as shown in FIG. 1. Of course, additional machine movements can be checked by providing additional read-out points, but the programs which are illustrated correspond to eighteen read-outs for a number of operations associated with the functions of the loader and transferring device and of certain portions of the dual cutting machines. The eighteen positions of angular rotation of the control drum are shown in the programs together with labels of what read-outs, if any, are to be checked at each of those positions. In addition, the lefthand column of each figure illustrates certain operational functions, of the loader and of the machines, which are being carried out in accordance with what is being dictated by the cam means 304 at given points of rotation of the control drum. It can be seen that chucks associated with work spindles at each work station (left and right) are activated in a certain timed relationship to the operation of jaws associated with holding devices carried by the loader and transfer means. Also, the work spindles at each work station include means for sliding and tilting the entire assembly in which the work spindle is carried so that a workpiece can be moved from a preferred position for cutting to a preferred position for being handled by the loader and transfer device. Hydraulic systems control the movements of the work spindles as indicated by the labels for sliding and swinging each "base" of each of two machines. With the air read-out system provided by this invention, it is possible to check the movement of almost any element in a machine, and the eighteen positions which are illustrated in FIG. 24 are only examples of possible read-outs which can be utilized. Taking a typical position as an example, position 4 of FIG. 24 corresponds to the part of a work handling cycle wherein the loader and transfer means 16 has been lowered to receive and grip workpieces in each of its holding devices. Then, it is determined whether the loader turret is in a fully seated position at its lower limit of movement, and if so, the control drum 302 can be further rotated to dictate a control function which activates the jaw members 152 of holding devices associated with the loader to effect a gripping of the separate workpieces to be picked up (position 5). At position 6, the workpiece are dechucked from their stations so that they can be lifted by the loader device. Previous control functions have initiated the required downward movement of the loader and have moved the sliding and swinging bases of the work spindles into proper positions for aligning the workpieces with the holding devices of the work loader. At position 7, the loader is actuated to lift the workpieces vertically out of their stations without any rotational movement being applied to the loader, and at station 8, the turret of the loader and transfer device 16 is rotated when the loader is in its uppermost position. Then, the loader is lowered to release the workpieces at new stations, and at station 10 a read-out is provided to determine whether the workpieces have properly seated in their work spindles for supporting structures at their stations. In this manner, a complete cycle of operations can be determined from the program shown in FIG. 24. As mentioned, air read-outs can be provided anywhere that they are desired, and a typical read-out is illustrated in FIG. 7 at 380 wherein a disc 382 carried by the rotating element 384 functions to cover the passageway 380 when the rotating element 384 is in a certain angular position corresponding to a rotational position of the loader and transfer device. Failure of the loader to rotate to the prescribed position will allow an escape of air from the outlet 380, and this will prevent further controls from being dictated by the control drum 302.

Figure 25:
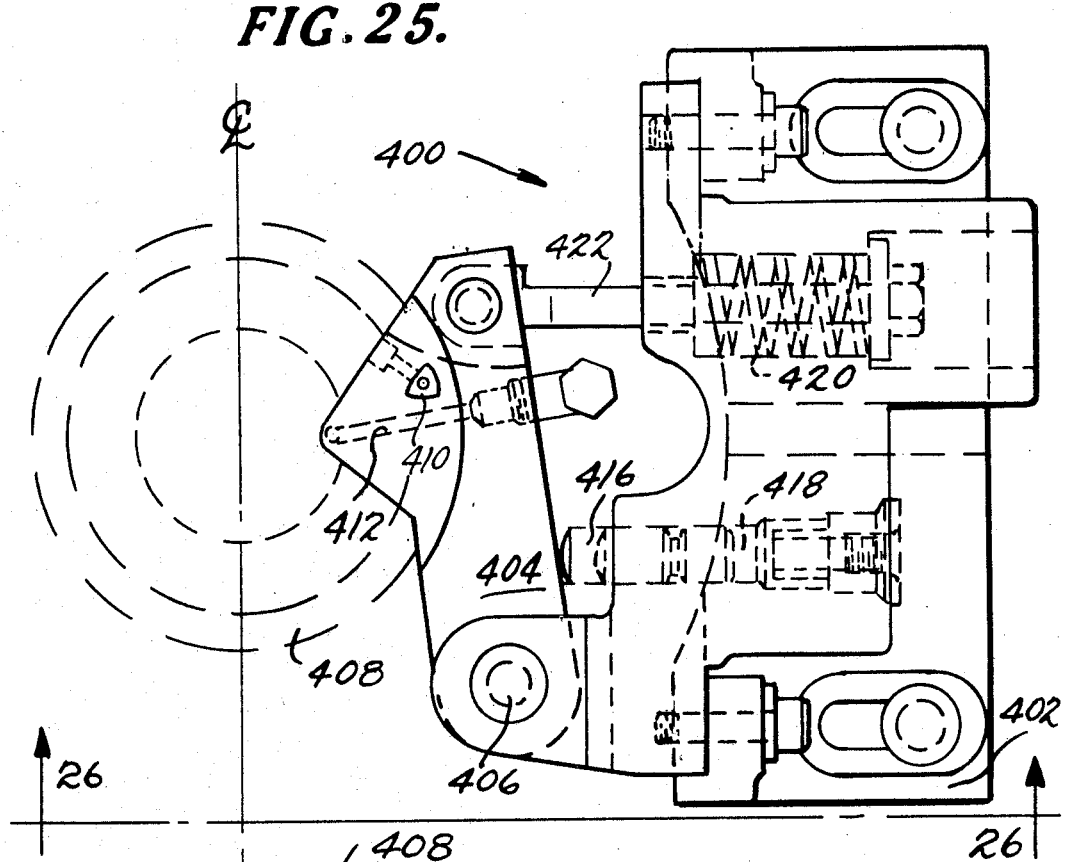
FIG. 25 is a top plan view of a checking device associated with the machines of this invention for providing an automatic check of stock division and proper seating of a workpiece in a work holding spindle.
Figure 26:
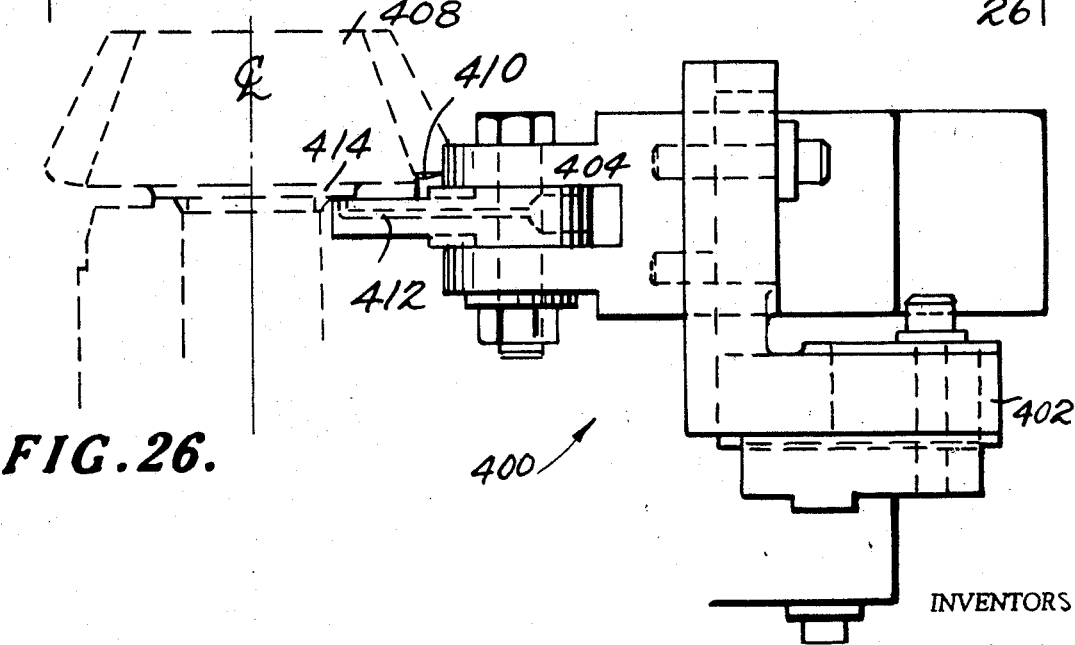
FIG. 26 is an elevational view in cross section, as seen on line 26—26 of FIG. 25.

Checking means for determining stock division and seating of a gear piece in a bevel gear making machine FIGS. 25 and 26 illustrate a novel device 400 for simultaneously checking stock division of a previously cut workpiece and proper seating of the workpiece in a work spindle. The checking device 400 is mounted at each work station of gear cutting machines which require a proper orientation of a previously cut workpiece for a subsequent cutting operation. As discussed in an earlier part of this specification, a novel loader and transfer device automatically provides for proper stock division by indexing or rotating a workpiece while it is being moved from one work station to another. However, it is desirable to determine whether the desired stock division has actually occurred, and the device 400 is intended to check each workpiece as it is being received at a given work station.

The checking device 400 includes housing structure 402 for mounting the device on a portion of the work head assembly of a machine. The device includes an arm 404 which can be moved about a pivot 406 toward and away from a workpiece 408. The arm 404 carries a projecting element 410 which is of a shape and size to fit into a previously cut groove of the workpiece when the arm 404 is moved to a limit position toward the workpiece, In addition, the arm 404 carries an air read-out passageway 412 which is blocked by a portion of the workpiece when the workpiece is in a fully seated position in a work spindle. Thus, the arm 404 provides a dual function of determining (a) whether previously cut grooves of a workpiece are properly oriented for a new cutting operation and (b) whether the workpiece is properly seated.

In the preferred arrangement; the arm 404 is mounted to rotate in a horizontal plane so that it passes beneath the heel of a workpiece so as to place the outlet of passageway 412 against a lowermost face 414 of the workpiece. It can be seen that the projecting element 410 of arm 404 must be received in a workpiece before the passageway 412 is blocked by the small diameter face 414, and this is a preferred arrangement since it prevents a read-out of the gear piece seating until the projecting element 410 has been received into the full depth of a groove formed in the gear piece. Thus, if the gear piece is out of proper orientation, the projecting element 410 cannot enter a groove, and the control drum 304 of the above described control system will be stopped from further rotation.

Means for moving the arm 404 include a rod 416 which is actuated by fluid pressure in a chamber 418. Pressure is admitted to the chamber 418 from the same conduit which dechucks the workpieces from their work spindles, and thus, the checking device 400 is moved into an operative position each time workpieces are being picked up by the loader and transfer device discussed above. After the loader and transfer device has picked up the workpieces and has been rotated, new workpieces are received into the work stations, and at that point, the checking device 400 determines whether the new workpiece is properly oriented and seated relative to its work spindle and its associated cutter. The arm 404 may be retracted before a cutting operation is initiated by a release of hydraulic pressure from the chamber 418 and by the action of a spring means 420 which is loaded in a separate cylindrical chamber to normally urge rod 422 in a direction away from a workpiece.

FIG. 27 illustrates structure associated with a conveyor 26 which moves work blanks and workpieces into and out of a third station associated with a cutting arrangement of the type shown in FIG. 2. A workpiece 500 is shown being contacted by a lifting mechanism 502 which includes a spindle 504 actuated by a piston and rod assembly 506. Springs 508 normally urge the lifting assembly downwardly, but hydraulic fluid can be admitted in the chamber 510 to lift the workpiece into a position where it can be received by the jaw members of a holding device of the loader and transfer means 16.

What is claimed is:

1. A system for controlling and checking sequential steps of operation of a machine comprising
a control drum having a plurality of cam means stacked on a common axis of rotation, with each cam means functioning to dictate a step of operation of the machine,
motor means operatively connected to said control drum to rotate the control drum and all of said plurality of cam means to dictate a sequence of steps of operation for the machine,
a fluid pressure read-out system having a supply of fluid under pressure and a pressure switch means in communication with the fluid under pressure, said pressure switch means being operatively connected to said motor means to actuate the motor means when a certain level of pressure is detected by said pressure switch means, and
conduit means in communication with said read-out system to sequentially convey fluid under pressure to a series of passageways which communicate with various moving elements of the machine, and each of said passageways having an open terminal end which can be blocked and unblocked in accordance with the presence or absence of a movable machine element associated with the passageway, whereby the presence of machine elements at specific points can be detected at specific times in a sequence of operations so that the machine can be automatically stopped if a particular machine element has not performed its intended function.

2. The system of claim 1 wherein said conduit means communicates with a distributor means carried by said control drum for rotation therewith, said distributor means having a single flow path therethrough for registering with only a single one of said series of passageways at a time in accordance with the rotational position of said control drum.

3. The system of claim 1 wherein said fluid pressure read-out system is connected to a source of air under pressure for operating the system.

4. The system of claim 1 wherein said motor means is operatively connected to said control drum by a geneva gear mechanism which functions to rotate the control drum with a step-wise intermittent motion so that the machine can be easily stopped at any point in its operation where said read-out system detects a failure of operation.

5. The system of claim 1 wherein said cam means each comprise a cam plate which has a closed cam path formed in one surface thereof, a follower means which rides in said cam path, and a lever means connected to said follower means to move in accordance with the profile of the closed cam path, said follower means further being connected to a control valve means which controls a flow of hydraulic fluid to a part of said machine to perform an operation of the machine, whereby a particular step of the machine cannot be performed until the control drum has rotated to a position which will effect a control of a hydraulic system associated with the performance of said particular step.

6. The system of claim 1 wherein said motor means comprises a hydraulically operated motor.

7. A system for controlling and checking sequential steps of automatic operation of a bevel gear cutting machine comprising:
a control drum having a plurality of cam means stacked on a common axis of rotation, said cam means functioning to control a sequence of steps of operation of work handling and transfer means associated with said machine,
work handling and transfer means operatively associated with said control drum means and with hydraulic control systems for carrying out a series of work handling and transfer steps between gear cutting cycles of the machine,
motor means operatively connected to said control drum to rotate the control drum and all of said plurality of cam means to dictate a sequence of steps of operation for said handling and transfer means,
a fluid pressure read-out system having a supply of fluid under pressure and a pressure switch means in communication with the fluid under pressure, said pressure switch means being operatively connected to said motor means to actuate the motor means when a certain level of pressure is detected by said pressure switch means, and
conduit means in communication with said read-out system to sequentially convey fluid under pressure to a series of passageways which communicate with various moving elements of said work handling and transfer means, each of said passageways having an open terminal end which can be blocked and unblocked in accordance with the presence or absence of a movable element associated with an operation of the work handling and transfer means, whereby the presence of said elements at specific points can be detected at specific times in a sequence of operations so that the work handling and transfer means can be automatically stopped if a particular element has not moved in accordance with its intended function.

8. The system of claim 7 wherein said control drum also includes switch actuating means for starting an automatic gear cutting cycle of the machine when said control drum has reached a specific position of rotational movement.

9. The system of claim 8 wherein said control drum also includes a switch actuating means for starting an automatic cycle of a chamfering means associated with said machine.

10. The system of claim 7 wherein said conduit means communicates with a distributor means carried by said control drum for rotation therewith, said distributor means having a single flow path therethrough for registering with only a single one of said series of passageways at a time in accordance with the rotational position of said control drum.

11. The system of claim 7 wherein said fluid pressure read-out system is connected to a source of air under pressure for operating the system.

12. The system of claim 7 wherein said motor means is operatively connected to said control drum by a geneva gear mechanism which functions to rotate the control drum with a step-wise intermittent motion so that the machine can be easily sopped at any point in its operation where said read-out system detects a failure of operation.

13. The system of claim 7 wherein said cam means each comprise a cam plate which has a closed cam path formed in one surface thereof, a follower means which rides in said cam path, and a lever means connected to said follower means to move in accordance with the profile of the closed cam path, said follower means further being connected to a control valve means which controls a flow of hydraulic fluid to a part of said work handling and transfer means to perform an operation thereof, whereby a particular step of the work handling and transfer means cannot be performed until the control drum has rotated to a position which will effect a control of a hydraulic system associated with the performance of said particular step.

14. The system of claim 7 wherein said motor means comprises a hydraulically actuated motor.

15. The system of claim 7 wherein the cam means of said control drum include cams for controlling the movements of a work spindle means which must be moved from a position for cutting a workpiece to a position for transferring a workpiece.

16. The system of claim 7 wherein said work handling and transferring means is positioned between two gear cutting machines so that separate cutting operations can be carried out on each workpiece by each machine, each of said gear cutting machines having a work head assembly for receiving and holding a workpiece while it is being cut.

17. The system of claim 16 wherein said cam means of said control drum include cams to control the chucking and de-chucking of workpieces in each work head assembly.

18. The system of claim 17 wherein said cam means of said control drum includes cams to control movements of said work head assemblies back and forth between cutting positions and positions for receiving or releasing workpieces relative to the work handling and transfer means.

19. A system for controlling and checking sequential steps of operation of a machine comprising
a control drum having a plurality of control means functioning to dictate steps of operation of the machine,
motor means operatively connected to said control drum to rotate the control drum and all of said plurality of control means to dictate a sequence of steps of operation for the machine,
a fluid pressure read-out system having a supply of fluid under pressure and a pressure switch means in communication with the fluid under pressure, said pressure switch means being operatively connected to said motor means to actuate the motor means when a certain level of pressure is detected by said pressure switch means,
conduit means in communication with said read-out system to sequentially convey fluid under pressure to a series of passageways which communicate with various moving elements of the machine, and each of said passageways having an open terminal end which can be blocked and unblocked in accordance with the presence or absence of a movable machine element associated with the passageway, whereby the presence of machine elements at specific points can be detected at specific times in a sequence of operations so that the machine can be automatically stopped if a particular machine element has not performed its intended function.

20. The system of claim 19, and including a separate switch means for periodically stopping the control drum so that read-outs can be taken by said read-out system.

References Cited
UNITED STATES PATENTS

| | | | |
|---|---|---|---|
| 2,155,271 | 4/1939 | Jones | 318—162 X |
| 2,833,434 | 5/1958 | Stover et al. | 214—1 X |
| 3,169,446 | 2/1965 | Anderson et al. | 90—1 |
| 3,229,585 | 1/1966 | Deprez et al. | 90—1 |
| 3,425,167 | 2/1969 | Pope | 51—165 X |

GIL WEIDENFELD, Primary Examiner

U.S. Cl. X.R.

307—141, 144; 318—162